US012741362B2

(12) United States Patent
Lovelass et al.

(10) Patent No.: US 12,741,362 B2
(45) **Date of Patent: *Sep. 22, 2026**

(54) POWER TOOL HAVING MULTIPLE OPERATING MODES

(71) Applicant: BLACK & DECKER INC., New Britain, CT (US)

(72) Inventors: Shaun Lovelass, Newton Aycliffe (GB); Marco A. Mattucci, Baltimore, MD (US); Jason McRoberts, Red Lion, PA (US); David Miller, Aberdeen, MD (US); Christopher J. Murray, Philadelphia, PA (US); Wong Kun Ng, New York, NY (US); Steven J. Phillips, Ellicott City, MD (US); Jonathan Priestley, Darlington (GB); Fugen Qin, Timonium, MD (US); Oleksiy Sergyeyenko, Baldwin, MD (US); Christopher W. Shook, Bel Air, MD (US); Kevin Stones, County Durham (GB)

(73) Assignee: BLACK & DECKER INC., New Britain, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/196,143

(22) Filed: May 1, 2025

(65) Prior Publication Data

US 2025/0326101 A1 Oct. 23, 2025

Related U.S. Application Data

(63) Continuation of application No. 16/020,191, filed on Jun. 27, 2018, now Pat. No. 12,318,906, which is a (Continued)

(51) Int. Cl.
*B25F 5/00* (2006.01)
*B23Q 5/10* (2006.01)
(Continued)

(52) U.S. Cl.
CPC ................ *B25F 5/001* (2013.01); *B23Q 5/10* (2013.01); *B25B 23/147* (2013.01); *B25F 5/00* (2013.01); *B25F 5/02* (2013.01)

(58) Field of Classification Search
CPC .... B25F 5/001; B25F 5/00; B25F 5/02; B25B 23/147; B23Q 5/10
(Continued)

(56) References Cited

U.S. PATENT DOCUMENTS 3,718,211 A * 2/1973 Schubert ............. B23Q 39/042 192/84.2
5,062,491 A * 11/1991 Takeshima ............ B25B 23/147 173/1
5,955,791 A * 9/1999 Irlander ............... H01H 47/001 307/41
12,318,906 B2 * 6/2025 Lovelass .................. B23Q 5/10
2003/0196824 A1 * 10/2003 Gass ..................... B23B 45/008 173/131

(Continued)

*Primary Examiner* — Linda J. Hodge
(74) *Attorney, Agent, or Firm* — Stephen R. Valancius

(57) ABSTRACT

A hand-held power tool is configured to receive an input indicative of a clutch setting for an electronic clutch from the tool operator, where the clutch setting is selectable from a drill mode, an automated drive mode and one or more user-defined drive modes. Each of the user-defined drive modes specifies a different value of torque at which to interrupt transmission of torque to the output spindle. In an automated drive mode, the controller interrupt torque to the output spindle in an automated manner when a fastener being driven reaches a desired stopping position. In a selected one of the user-defined drive modes, the controller sets a value of a maximum current threshold in accordance with the selected one of the user-defined drive modes and interrupts torque to the output spindle when current measures exceeding the maximum current threshold.

20 Claims, 29 Drawing Sheets

Related U.S. Application Data continuation of application No. 13/832,454, filed on Mar. 15, 2013, now abandoned.

(60) Provisional application No. 61/657,269, filed on Jun. 8, 2012.

(51) Int. Cl.
*B25B 23/147* (2006.01)
*B25F 5/02* (2006.01)

(58) Field of Classification Search
USPC .............................................................. 173/1
See application file for complete search history.

(56) References Cited

U.S. PATENT DOCUMENTS

| | | | | |
|---|---|---|---|---|
| 2007/0210733 | A1 * | 9/2007 | Du | H02K 1/278 318/268 |
| 2013/0119791 | A1 * | 5/2013 | Takeyama | B25F 5/00 320/103 |
| 2013/0193891 | A1 * | 8/2013 | Wood | H02P 6/08 318/434 |
| 2014/0008087 | A1 * | 1/2014 | Brown | B23Q 41/00 173/1 |
| 2014/0159920 | A1 * | 6/2014 | Furui | B25F 5/02 340/870.07 |

* cited by examiner

142

| CAPACITY LEVEL | VOLTAGE (NO LOAD CURRENT) | | |
|---|---|---|---|
| 100% | 21 | 21 | 21 |
| 90% | 20.3842 | 20.385 | 20.38 |
| 80% | 20 | 20 | 20 |
| 70% | 19.6 | 19.6 | 19.61 |
| 60% | 19.18 | 19.17 | 19.17 |
| 50% | 18.69 | 18.68 | 18.68 |
| 40% | 18.37 | 18.36 | 18.36 |
| 30% | 18.16 | 18.16 | 18.16 |
| 20% | 17.93 | 17.92 | 17.92 |
| 10% | 17.48 | 17.48 | 17.48 |
| 0% | 16.2 | 16.2 | 16.2 |
| | DISCHARGE AT 10A | DISCHARGE AT 3A | DISCHARGE AT 5A |

428

| SELECT INPUT LEVEL | TORQUE LEVEL(A) | LED DISPLAY |
|---|---|---|
| 1 | 3.5 | BLUE 1 |
| 2 | 5 | BLUE 1 AND GREEN 1 |
| 3 | 6.5 | BLUE 2 |
| 4 | 8 | BLUE 2 AND GREEN 2 |
| 5 | 9.5 | BLUE 3 |
| 6 | 11 | BLUE 3 AND GREEN 3 |
| 7 | 12.5 | BLUE 4 |
| 8 | 14 | BLUE 4 AND GREEN 4 |
| 9 | 15.5 | BLUE 5 |
| 10 | 17 | BLUE 5 AND GREEN 5 |
| 11 | 18.5 | BLUE 6 |
| 12 | 20 | BLUE 6 AND GREEN 6 |

FIG 22B

POWER TOOL HAVING MULTIPLE OPERATING MODES

CROSS-REFERENCE TO RELATED APPLICATIONS

This application is a continuation of U.S. patent application Ser. No. 16/020,191 filed on Jun. 27, 2018, which is a continuation of U.S. patent application Ser. No. 13/832,454 filed on Mar. 15, 2013, and which claims the benefit of U.S. Provisional Application No. 61/657,269, filed on Jun. 8, 2012. The entire disclosure of the above applications is incorporated herein by reference.

FIELD

The present disclosure relates to portable hand-held power tools including drills and drill drivers.

BACKGROUND

It is known to provide a power tool with switches, knobs, and other controls. For example, a power drill or driver typically includes a trigger that the user actuates to cause rotation of a tool held in a chuck. Power drills or drivers also typically include a forward/reverse selector switch located near the trigger that the user actuates to change a rotation direction of the tool. Some power drills or drivers also include a clutch control (e.g., a dial) that is used to change a clutch torque setting such that the amount of resistance necessary to stop rotation of the chuck can be set or changed by the user.

Conventional power tool controls suffer from certain disadvantages. For example, conventional controls can be awkward to manipulate while holding the power tool. The user is often required to hold the tool with a first hand and set or change operating controls with a second hand, and controls may take up substantial space or be awkwardly located, thereby making setting or changing control operations difficult. Moreover, these power tools may have a manual only or an automatic only operated clutch, thereby limiting operational control of the clutch and tool.

This section provides background information related to the present disclosure which is not necessarily prior art.

SUMMARY

This section provides a general summary of the disclosure, and is not a comprehensive disclosure of its full scope or all of its features.

In one aspect of this disclosure, a method is provide for operating a power tool having an electric motor drivably connected to an output spindle. The tool is configured to receive an input indicative of a clutch setting for an electronic clutch form the tool operator, where the clutch setting is selectable from a drill mode and a drive mode. In a drill mode, torque applied to the output spindle is ignored; whereas, in the drive mode, the torque applied to the output spindle is monitored and interrupted in an automated manner by a controller when a fastener being driven reaches a desired stopping position.

In other aspects of this disclosure, the clutch setting is selectable from a drill mode, an automated drive mode and one or more user-defined drive modes, where each of the user-defined drive modes specifies a different value of torque at which to interrupt transmission of torque to the output spindle. In an automated drive mode, the controller interrupt torque to the output spindle in an automated manner when a fastener being driven reaches a desired stopping position. In a selected one of the user-defined drive modes, the controller sets a value of a maximum current threshold in accordance with the selected one of the user-defined drive modes and interrupts torque to the output spindle when current measures exceeding the maximum current threshold.

An improved technique for detecting when a fastener has reaches a desired stopping position is also presented. The improved techniques generally includes: sampling periodically current delivered to the electric motor; storing a sequence of current measures most recently sampled; and determining a slope for the sequence of current measures by way of linear regression. Transmission of torque to the output spindle can be interrupted based in part on the slope of the current measures.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 22B is a table of selected input level, torque level and corresponding LED display data corresponding to the clutch torque flow diagram FIG. 22A;

Corresponding reference numerals indicate corresponding parts throughout the several views of the drawings.

DETAILED DESCRIPTION

Figure 1:
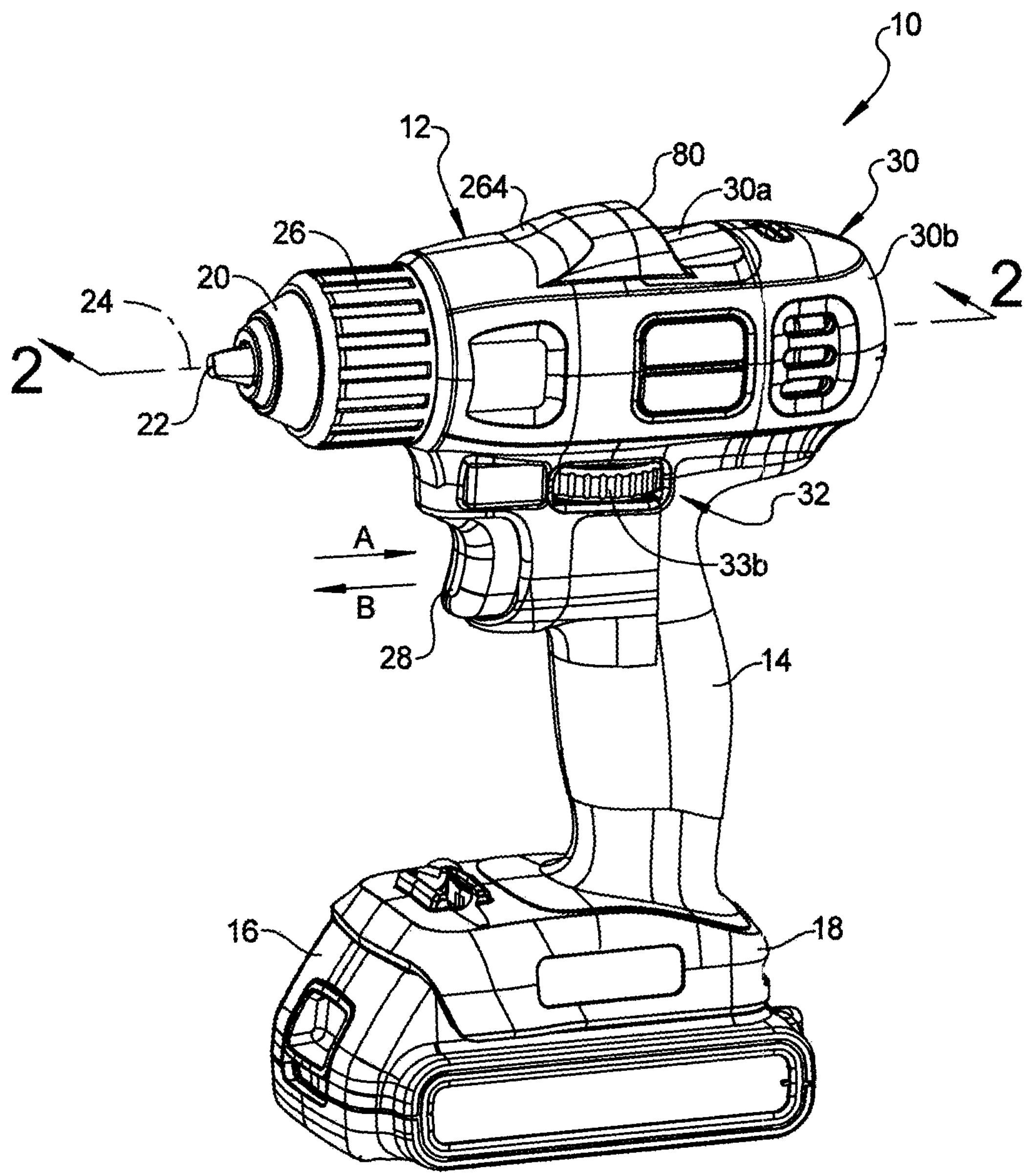
FIG. 1 is a front left perspective view of a drill/driver of the present disclosure.

Referring to FIG. 1, a portable hand-held power tool which in one form is a drill driver 10 includes a body 12 having a handle 14 shaped to be grasped in a single hand of a user, a rechargeable battery pack 16 that is releasably connected to a battery mounting portion 18 of body 12, and a chuck 20 having two or more clutch jaws 22 which are axially rotated with respect to a rotational axis 24. A clutch sleeve 26 is also rotatable with respect to rotational axis 24 that is used to manually open or close clutch jaws 22. While the following description is provided with reference to a drill driver, it is readily understood that some of the features set forth below are applicable to other types of power tools.

A manually depressible and return biased trigger 28 is provided to initiate and control operation of drill driver 10. Trigger 28 is operated by manually depressing in a trigger engagement direction "A" and returns in a trigger release direction "B" upon release. Trigger 28 is provided in a motor housing 30 that according to several aspects is divisible into individual halves, including a motor housing first half 30*a* and a motor housing second half 30*b* which can be made for example of molded polymeric material. Positioned adjacent to trigger 28 is a rotary potentiometer/switch assembly 32. A portion 33*b* of rotary potentiometer/switch assembly 32 extends freely outwardly from body second half 30*b* on a second or left hand side of body 12. A similar portion 33*a* (shown in reference to FIG. 5) extends freely outwardly from body first half 30*a* on a first or right hand side of body 12. Rotary potentiometer/switch assembly 32 provides several functions which will be described in reference to subsequent figures. A display port 80 is also provided with body 12 which will be described in greater detail in reference to FIG. 8.

Referring to FIG. 2 and again to FIG. 1, with the motor housing second half 30*b* removed for clarity, drill driver 10 further includes a DC motor 34 and a motor transmission 35, the motor 34 operable using DC current from battery pack 16 and controlled by trigger 28. Motor 34 and motor transmission 35 are mounted in motor housing 30 and are drivably connected via an output spindle (not shown) to chuck 20 for rotation of chuck 20. It is readily understood that broader aspects of this disclosure are applicable to corded tool as well as battery powered tools.

Rotary potentiometer/switch assembly 32 includes a rotary member 36 in the shape of a circular disk wherein portion 33*b* extending outward from body 12 is a portion of rotary member 36 extending freely outwardly with respect to body 12 on the left hand side of body 12. The outwardly extending portions 33*a*, 33*b* of rotary member 36 allow manual rotation and a side-to-side displacement of rotary member 36 by the user of drill driver 10 from either the right hand side or left hand side of body 12. Rotary member 36 is positioned in a housing space 38 of motor housing 30 providing clearance for both axial rotation of rotary member 36, and side-to-side displacement of rotary member 36 in either a left hand or a right hand displacement such that rotary potentiometer/switch assembly 32 performs at least dual functions as will be described in reference to FIGS. 3-6. According to further aspects, rotary member 36 can be replaced by a sliding member, a rocking member, or other types in input components.

A printed circuit board (PCB) 40 is positioned in handle 14. PCB 40 defines an electronic control circuit and includes multiple components including a microcontroller 42 such as a microchip, having a central processing unit (CPU) or the like for performing multiple functions of drill driver 10, at least one electrically erasable programmable read-only memory (EEPROM) function providing storage of data or selected inputs from the user of drill driver 10, and at least one memory device function for storing both temporarily and permanently saved data such as data lookup tables, torque values and the like for use by drill driver 10. According to other aspects (not shown), microcontroller 42 can be replaced by separate components including a microprocessor, at least one EEPROM, and at least one memory device.

Rotary member 36 is rotatable with respect to a rotary member axis of rotation 43. Rotation of rotary member 36 can be in either a first rotational direction "C" or a second rotational direction "D" which is opposite to first rotational direction "C". It is noted that the rotary member axis of rotation 43 can displace when rotary member 36 is moved in the side-to-side displacement described above and which will be described in greater detail in reference to FIG. 5.

Figure 2:
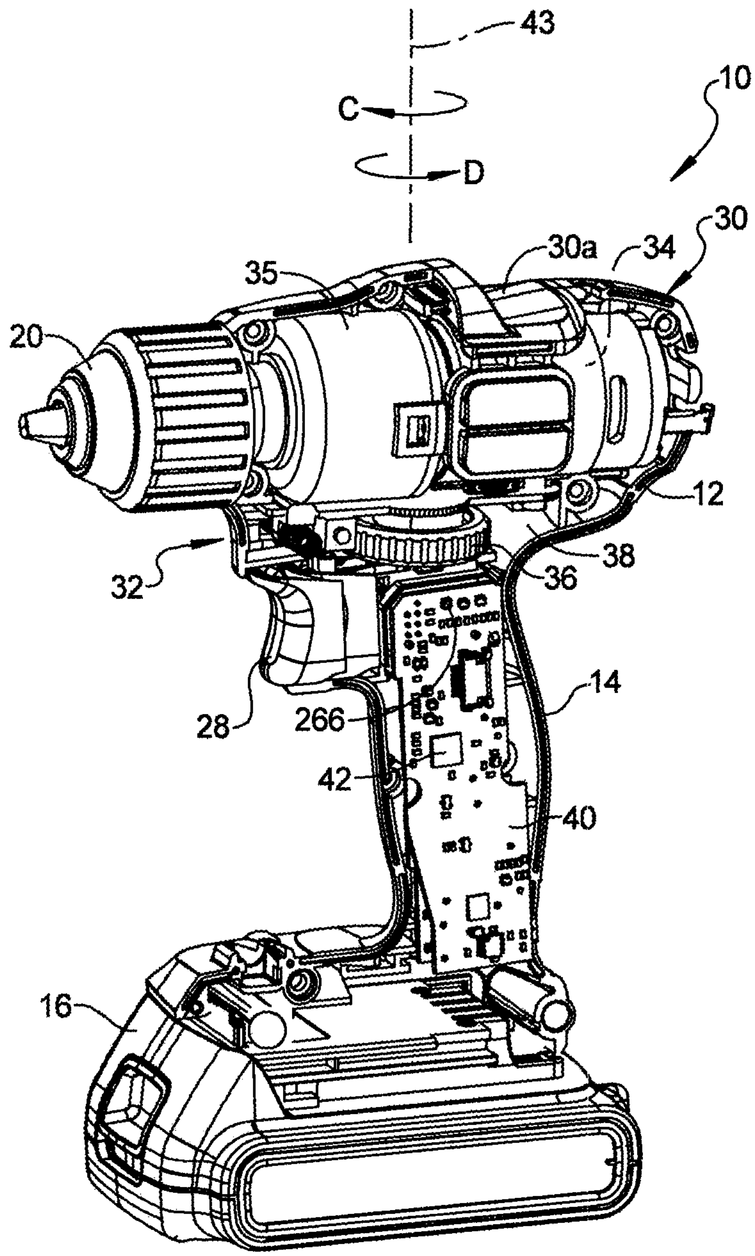
FIG. 2 is a partial cross sectional front left perspective view taken at section 2 of FIG. 1.

Referring to FIG. 3 and again to FIG. 2, the rotary potentiometer/switch assembly 32 has rotary member 36 rotatably connected to an assembly platform 44 such as a circuit board which is housed within body 12. A connector 46 is fixed to assembly platform 44 providing for electrical communication between assembly platform 44 and printed circuit board 40, thereby including assembly platform 44 with the electronic control circuit defined by PCB 40. Assembly platform 44 includes an assembly platform first end 48 having a first axle 50 extending from a first side of first end 48 and a second axle 52 oppositely directed with respect to assembly platform first end 48. First and second axles 50, 52 are coaxially aligned defining an axle axis of rotation 54. The first and second axles 50, 52 allow the assembly platform 44 as a unit to rotate with respect to axle axis of rotation 54. The assembly platform 44 further includes an assembly platform second end 56 having a mount member 58. Mount member 58 provides attachment and support for each of a first biasing member 60 and an oppositely directed second biasing member 62.

Figure 3:
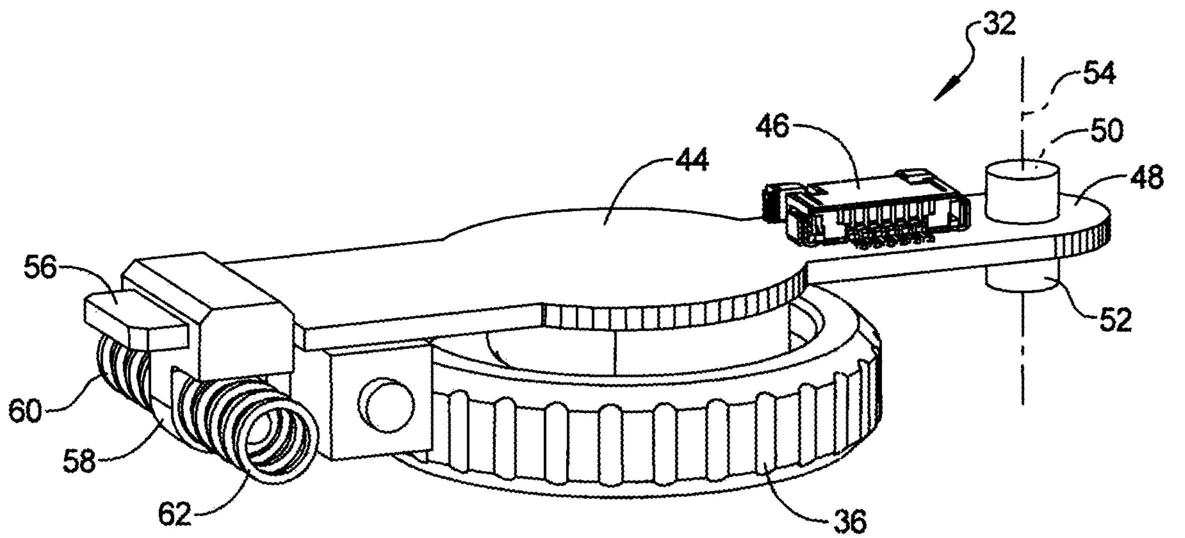
FIG. 3 is a front left perspective view of a rotary potentiometer and switch assembly of the present disclosure.

Referring to FIG. 4 and again to FIGS. 2 and 3, the first biasing member 60, which according to several aspects can be a compressible spring, contacts and is supported against a mount member first face 64 of mount member 58. First biasing member 60 is shown in its normally extended, non-biased condition. From this position, first biasing member 60 is compressible in a first compression direction "E". The second biasing member 62 is similar to first biasing member 60 and therefore provides a substantially mirror image configuration of a compressible spring which contacts and is supported against a mount member second face 66 of mount member 58. From its normally non-biased position shown in FIG. 4, second biasing member 62 is elastically compressible in a second compression direction "F" which is oppositely oriented with respect to first compression direction "E". During axial rotation of assembly platform 44 with respect to axle axis of rotation 54, either the first or the second biasing member 60, 62 is elastically depressed against one of the motor housing first or second halves 30*a*, 30*b*. The biasing force generated by compression of either first or second biasing member 60, 62 acts to return the assembly platform 44 to a neutral position when the manual force applied to rotate assembly platform 44 is released.

Figure 4:
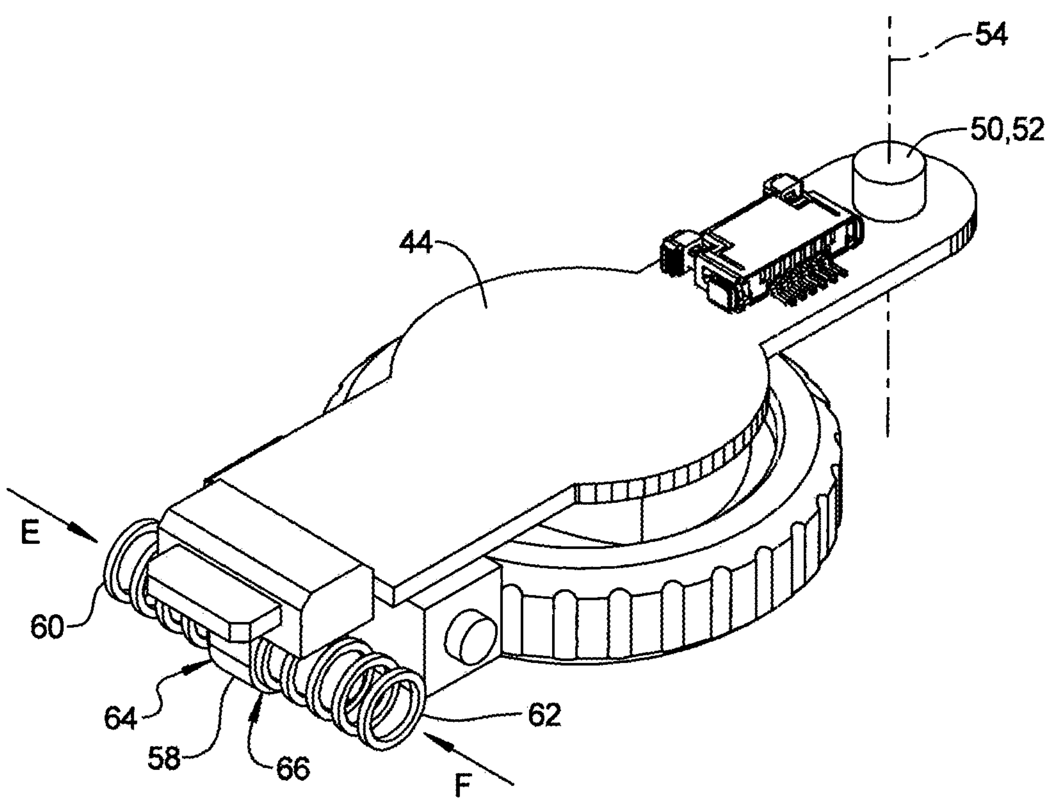
FIG. 4 is a top left perspective view of the rotary potentiometer and switch assembly of FIG. 3.

Referring to FIG. 5 and again to FIGS. 2-4, as previously noted assembly platform 44 is rotatable with respect to axle axis of rotation 54 using first axle 50 and second axle 52 (not visible in this view). With the assembly platform 44 positioned in a neutral position, rotary member 36 is axially rotatable with respect to rotary member axis of rotation 43 to either increase or decrease an operating torque created as a torque limit command or signal by the rotational position of rotary member 36 and applied to chuck 20. Rotary member 36 can be rotated in each of a first rotational direction "G", which is clockwise as viewed with respect to FIG. 5, or in a second rotational direction "H", which is opposite with respect to first rotational direction "G" and is therefore counterclockwise as viewed in FIG. 5. Axial rotation of rotary member 36 can be used, for example, to predetermine a torque setting of chuck 20 between a minimum and a maximum predetermined torque value as the torque limit command. For example, rotation of rotary member 36 in the first rotational direction "G" can be used to increase the torque setting or torque limit command, and rotation of rotary member 36 in the opposite second rotational direction "H" can be used to reduce the torque setting or torque limit command. Rotary member 36 can therefore act as a rotary potentiometer generating commands or signals transferred via connector 46 to PCB 40. The first and second portions 33*a*, 33*b* of rotary member 36 that extend outwardly from first and second halves 30*a*, 30*b* (shown in phantom) of body 12 are shown.

Figure 5:
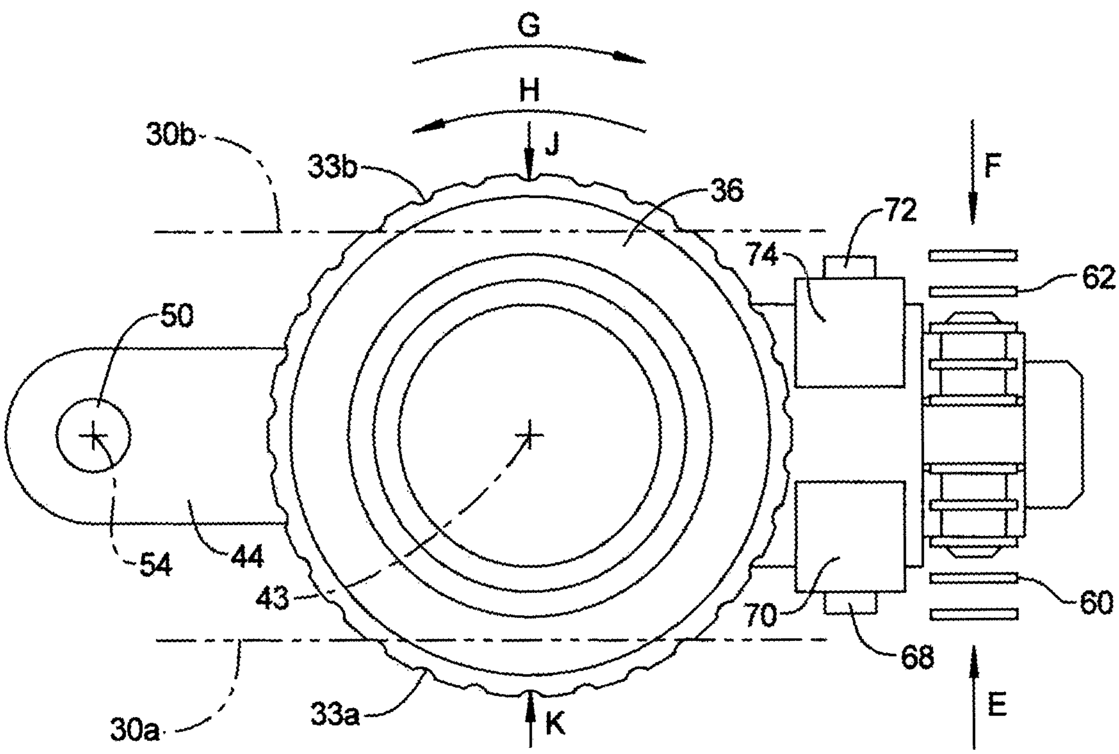
FIG. 5 is a top plan view of the rotary potentiometer and switch assembly of FIG. 3.
Figure 6:
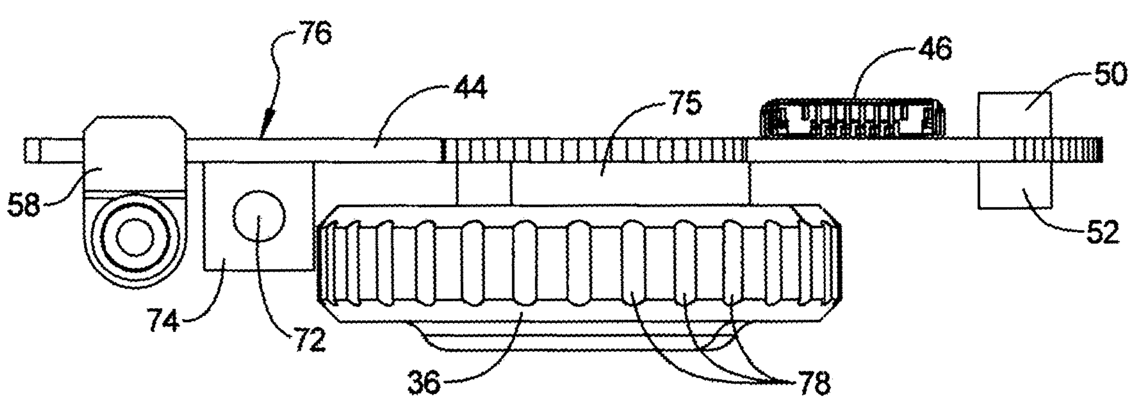
FIG. 6 is a left side elevational view of the rotary potentiometer and switch assembly of FIG. 3.

With continuing reference to FIG. 5, assembly platform 44 further includes mirror image switches which are actuated when assembly platform 44 is manually rotated with respect to axle axis of rotation 54. For example, when the operator applies a force to rotary member 36 in a first force acting direction "J", rotation of assembly platform 44 with respect to axle axis of rotation 54 acts to elastically compress first biasing member 60 in the first compression direction "E" until a first displacement member 68 of a first directional switch 70 is depressed/closed. When the operator applies a force to rotary member 36 from a second force acting direction "K", the assembly platform 44 rotates with respect to axle axis of rotation 54 such that second biasing member 62 is elastically compressed in the second compression direction "F" until a second displacement member 72 of a second directional switch 74 is depressed/closed. When the force applied in either the first or second force acting directions "J", "K" is removed, the biasing force of either of the first or second biasing members 60, 62 causes the assembly platform 44 to return to its original or neutral position, opening either the first or the second directional switch 70, 74. Circuits closed by operation of either the first or the second directional switch 70, 74 generate signals or commands used to determine a rotational direction of chuck 20, for example by setting either a forward (clockwise) rotation or a reverse (counter clockwise) directional rotation. The "dual mode" of operation provided by rotary potentiometer/switch assembly 32 in one aspect is first to control clutch torque and second to control the chuck rotation direction. The "dual mode" of operation can also include multiple variations of torque application, directional control, timed operation, clutch speed settings, motor current control, operation from data saved in memory from previous operations, and others as further defined herein.

The electronic control provided by microcontroller 42 and the electronic control circuit of PCB 40 determines multiple operations of drill driver 10. As previously noted, when first directional switch 70 is closed, chuck 20 will operate in a forward or clockwise operating rotational direction. In addition, by subsequent rotation of rotary member 36 following the actuation of first directional switch 70, additional modes of operation of drill driver 10 can be selected, including selecting a speed setting of motor 34, selecting an automatic torque cutout setting, selecting a speed control response, selecting a fastening seating algorithm, and additional modes which will be described later herein. If second directional switch 74 is closed, chuck 20 will be rotated in a reverse or counter-clockwise direction of rotation and subsequent rotation of rotary member 36 can have similar control mode selection features for operation of drill driver 10 in the reverse direction. In addition, the electronic control provided by operation of rotary member 36 and first and second directional switches 70, 74 can also be used to customize the operation of rotary member 36 through a series of operations of rotary member 36 and trigger 28 to suit either a left or right handed user of drill driver 10.

For example, once the user has set a left or right hand mode of operation, subsequent rotation of rotary member 36 can always result in a forward mode being selected such that the operation of drill driver 10 for either a right or left handed operator becomes intuitive for the operator. An advantage of placing rotary member 36 adjacent to handle 14, where the control of rotary member 36 is achieved for example by the thumb of the operator, provides for one-handed operation of drill driver 10, allowing control of multiple modes of operation in a one-handed operation. The same one-handed operation is also permitted by the rotational displacement provided by first and second axles 50, 52 of assembly platform 44 such that physical side-to-side rotational displacement of assembly platform 44 about the axle axis of rotation 54 provides additional functions for the accessible positions of rotary member 36.

Referring to FIG. 6 and again to FIGS. 2-5, the various components of assembly platform 44 can be fixed. For example, first and second axles 50, 52 and mount member 58 can be fixed using adhesives or integrally connected to assembly platform 44 during a molding process, creating assembly platform 44. First and second directional switches 70, 74 (only second directional switch 74 is clearly visible in this view) are also fixed to assembly platform 44. A mount member 75 fixed to assembly platform 44 allows for axial rotation of rotary member 36. According to several aspects, a planar surface 76 is defined by assembly platform 44 such that the components mounted to assembly platform 44 are retained in the same relative positions during axial rotation of rotary member 36 and also during axial rotation of assembly platform 44. A plurality of grip slots 78 can also be provided with rotary member 36 to assist in the axial rotation of rotary member 36. Grip slots 78 can also be positioned about the perimeter of rotary member 36 at locations corresponding to individual rotary positions that visually indicate to the operator the degree of rotation required to achieve a next torque setting of drill driver 10.

Figure 7:
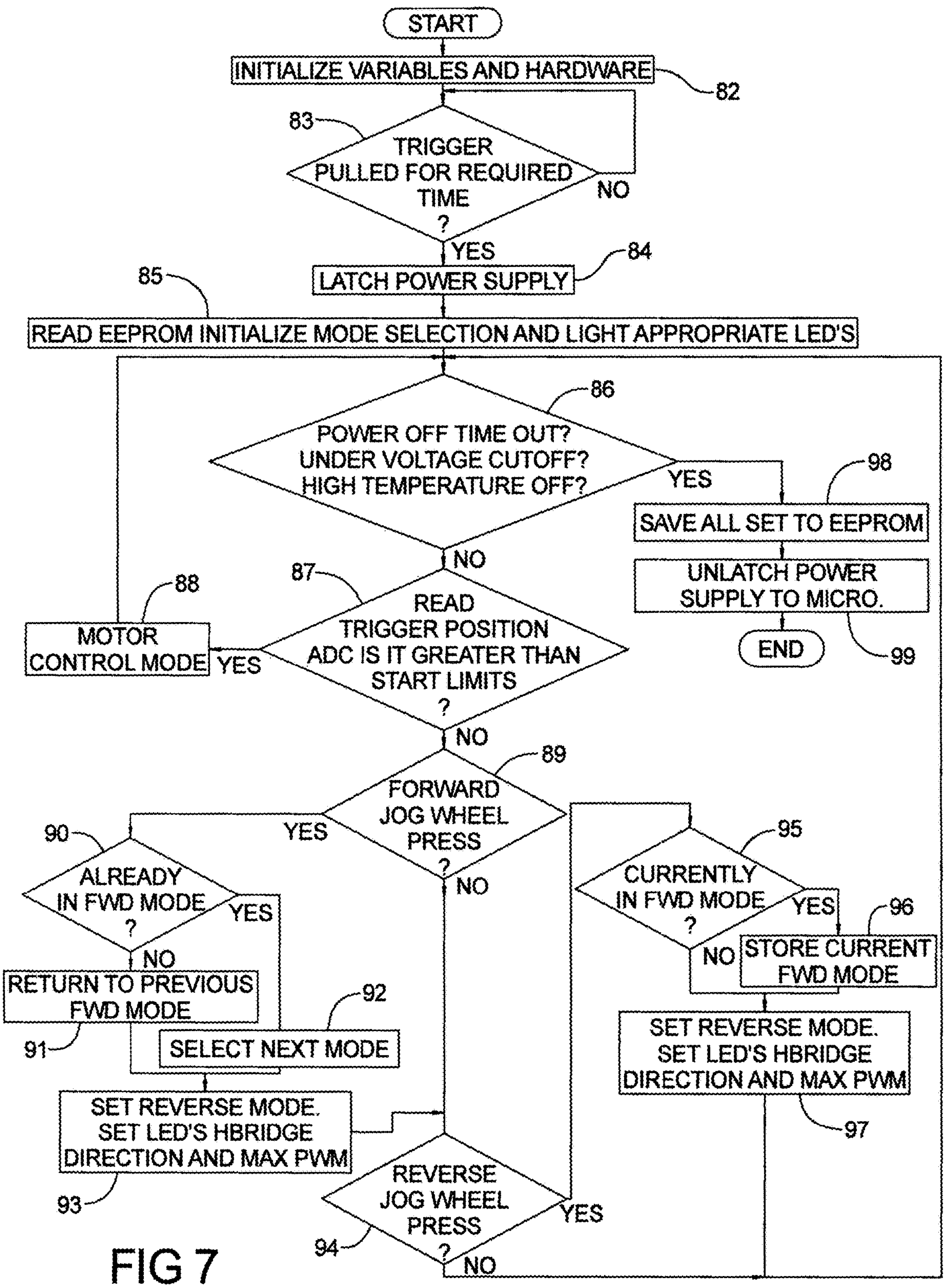
FIG. 7 is a flow diagram defining a forward/reverse clutch operation using a rotary potentiometer/switch assembly of the present disclosure.

Referring to FIG. 7, operation of the rotary potentiometer/switch assembly 32 is depicted in a flow diagram. In an initializing step 82, variables and hardware that may be in an off or standby mode are initialized. In a next trigger timing step 83, a time period following initiation of trigger pull is measured to determine if trigger 28 has been depressed for a minimum or required time period. If following the trigger timing step 83 it is determined that the minimum required time of trigger pull has not been met, this step repeats itself until the required minimum time period has been met. If following the trigger timing step 83 the required minimum time of depression of trigger 28 has been met, a latching step 84 is performed wherein the power supply to the motor is latched, thereby providing electrical power to the electrical components of drill driver 10. Following latching step 84, a read EEPROM step 85 is performed wherein data saved in the EEPROM of microcontroller 42 is accessed to initialize mode selection and to illuminate appropriate ones of the first through sixth LEDs 102-112. Following read EEPROM step 85, a shutdown check step 86 is performed wherein it is determined whether any of a power off timeout has occurred, an under-voltage cutoff has occurred, or a high temperature cutoff has occurred. If none of the conditions are present as determined in shutdown check step 86, a trigger position determination step 87 is performed wherein a trigger position ADC (analog-digital converter) is read to determine if it is greater than a predetermined start limit. If so, drill driver 10 is positioned in motor control mode in a motor controlling step 88. If the trigger position ADC reading is not greater than the predetermined start limits, a forward wheel determining step 89 is performed to determine if rotary member 36 has been rotated in a forward rotational direction. If so, in a check forward mode step 90, a determination is made if drill driver 10 is already positioned in a forward operating mode. If not, drill driver 10 is returned to a previous forward mode in a return step 91. If drill driver 10 is already in the forward operating mode, a next mode is selected in a select next mode step 92. Following either return step 91 or select next mode step 92, a setting step 93 is performed wherein the LEDs, an H-bridge forming a portion of PCB 40, and a maximum PWM (pulse width modulation) value are set. Following setting step 93, or if the forward wheel determining step 89 indicates that rotary member 36 has not been rotated in a forward rotating direction, a reverse wheel determining step 94 is performed. It is initially determined if drill driver 10 is in a forward operating mode in a check forward mode step 95, and if the forward mode is indicated the current forward operating mode is stored in a store mode step 96. Following either check forward mode step 95 or store mode step 96, a setting step 97 is performed which is similar to setting step 93 with the exception that the reverse mode is set in addition to setting the LEDs, the "H" bridge direction, and the maximum PWM. Returning to the shutdown check step 86, if any of the power off timeout, under-voltage cutoff, or high temperature cutoff indicators is present, a save to EEPROM step 98 is performed wherein values presently set for operation of drill driver 10 are saved to EEPROM of microcontroller 42. Following save to EEPROM step 98, an unlatch step 99 is performed wherein the power supply is unlatched.

Figure 8:
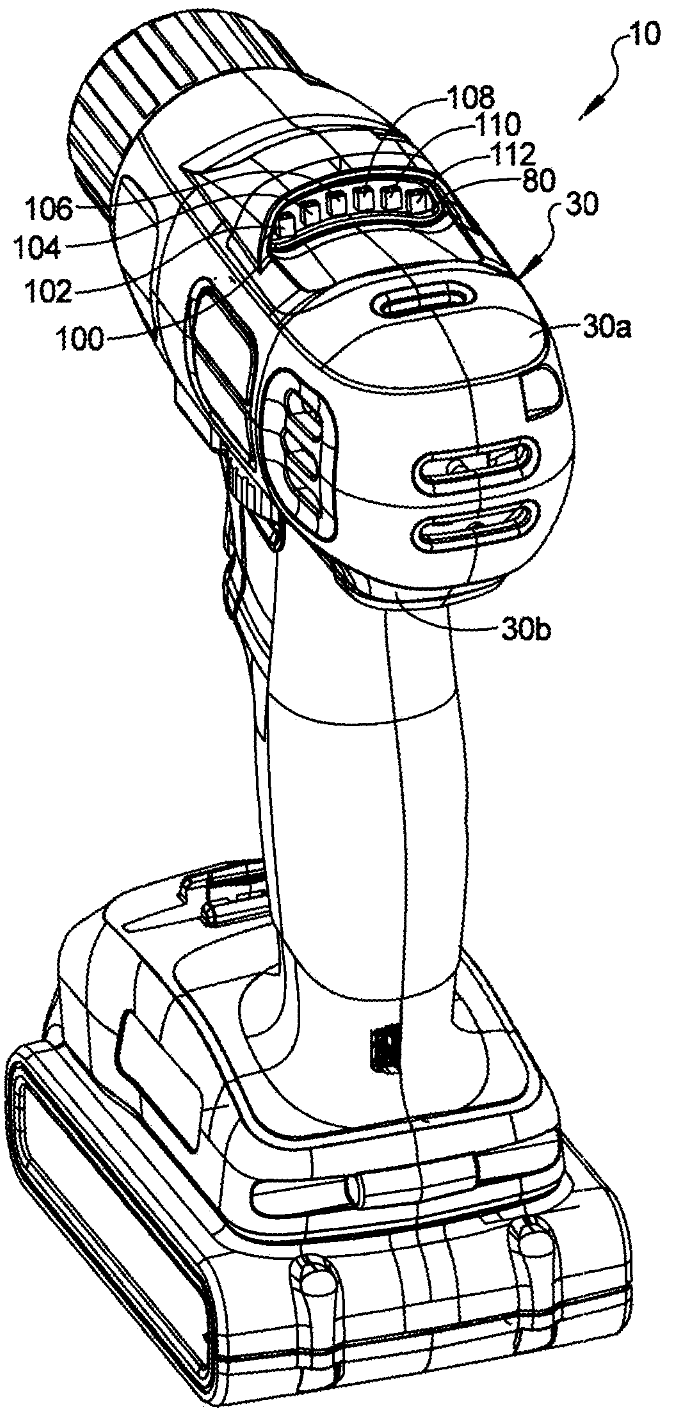
FIG. 8 is a left rear elevational perspective view of the drill/driver of FIG. 1.

Referring to FIG. 8, display port 80 can be provided on an upper surface of motor housing 30 and extend across both first and second halves 30*a*, 30*b* of motor housing 30. Display port 80 includes multiple bi-color light emitting diodes (LEDs) that are capable of displaying three colors, as two pure or primary colors plus a third color which is a mix of the two primary colors. Each LED color can therefore provide visual indication of multiple different operating modes of drill driver 10. The multiple LEDs include a first, second, third, fourth, fifth, and sixth LED 102, 104, 106, 108, 110, 112, all positioned on an LED display screen 100. For example, the LEDs of display port 80 can represent functions including a live torque reading, the status of battery 16, a direction of rotation of chuck 20, and a changing (increasing or decreasing) torque signal as rotary member 36 is rotated.

In one example, first through sixth LEDs 102-112 can be used to indicate the status of battery 16 as follows. If battery 16 is fully charged and therefore at maximum voltage potential, all of LEDs 102-112 will be illuminated. If battery 16 is at its lowest voltage potential, only first LED 102 will be illuminated. Successive ones of the LEDs, such as first, second and third LEDs 102, 104, 106, will be illuminated when battery 16 is at a capacity greater than the minimum but less than the maximum. The color used for illumination of the LEDs, for example during the battery status display check, can be different from the color used for other mode checks. For example, the battery state of charge indication can illuminate the LEDs using a green color while torque indication can use a blue color.

Figure 9A:
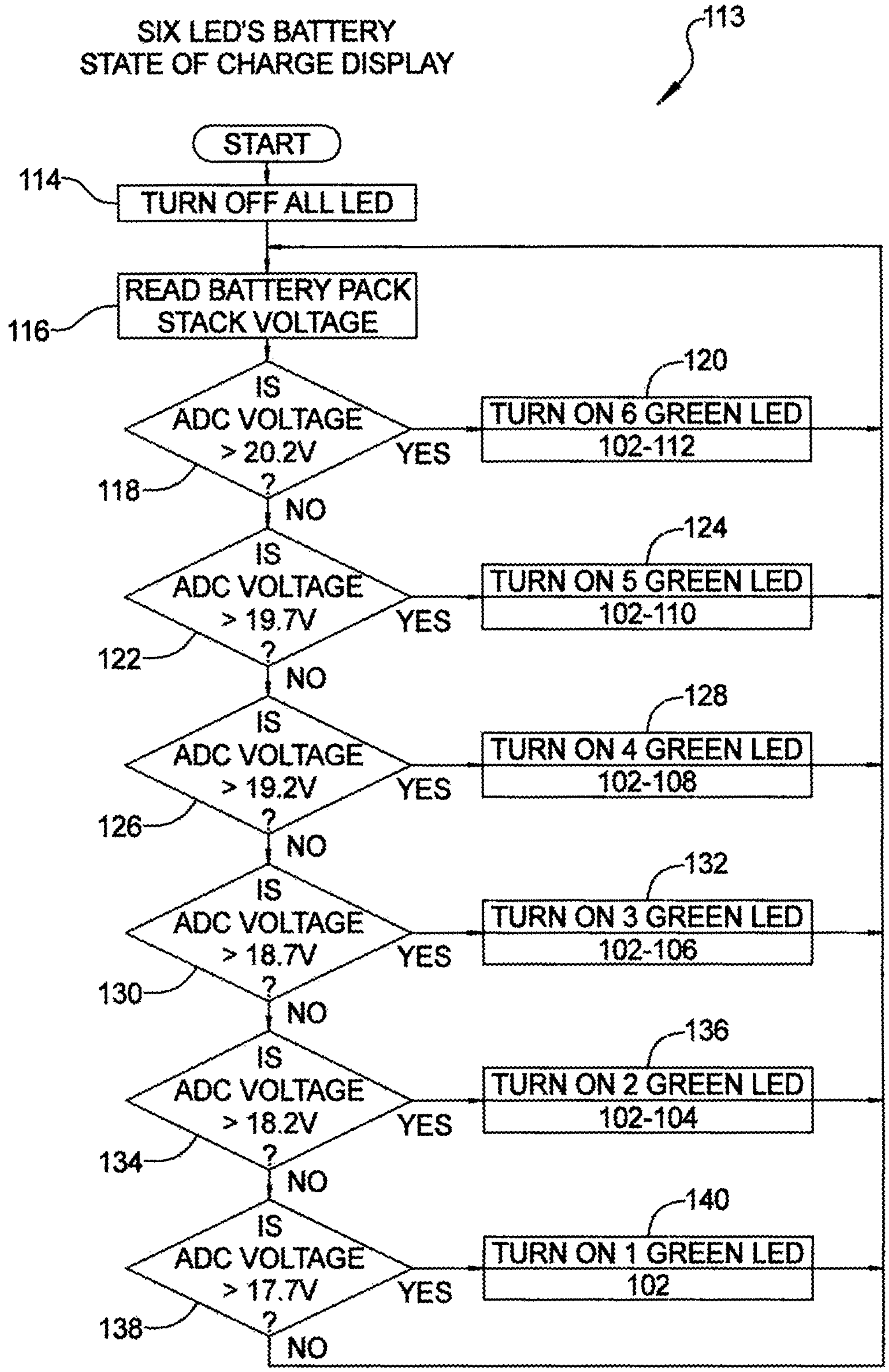
FIG. 9A is a flow diagram defining a battery state of charge operation of the present disclosure.
Figures 9B, 17:
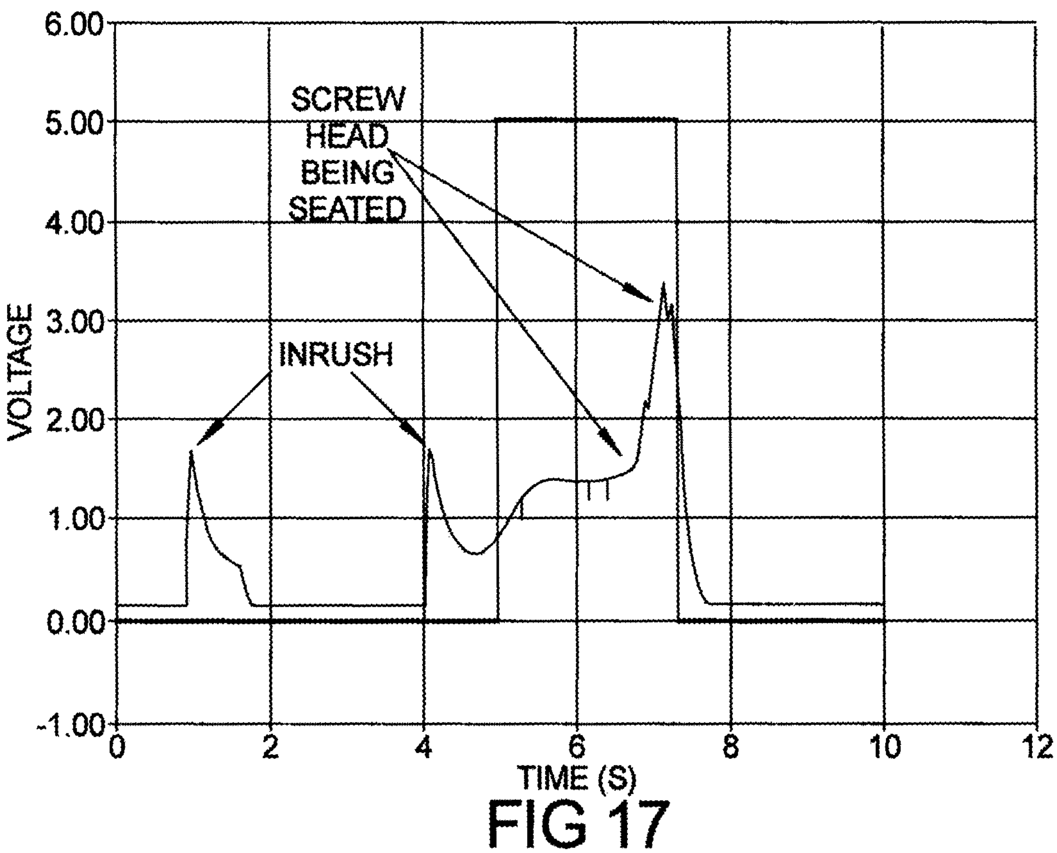
FIG. 9B is a table providing exemplary battery voltages at various capacity levels associated with the flow diagram of FIG. 9A.
FIG. 17 is a voltage versus time graph identifying a current flow during timed operation mode.

Referring to FIGS. 9A, 9B and again to FIG. 8, the battery state of charge display of display port 80 is depicted on a battery state of charge flow diagram 113 with corresponding voltages provided in a table 142 of FIG. 9B. In an initial LED de-energizing step 114, all of the LEDs 102-112 are turned off. In a next reading step 116, a stack voltage of battery 16 is read. In a first voltage determination step 118, if the battery voltage is above a predetermined value, for example 20.2 volts, all of the LEDs 102-112 are turned on in a LED energizing step 120. If, following the first voltage determination step 118, the voltage of battery 16 is less than 20.2 volts but greater than 19.7 volts, in a five LED energizing step 124 LEDs 102-110 are turned on. Following the second voltage determination step 122, if the voltage of battery 16 is less than 19.7 volts but greater than 19.2 volts, LEDs 102-108 are turned on in a four LED energizing step 128. Following the third voltage determination step 126, if the voltage of battery 16 is less than 19.2 volts but greater than 18.7 volts as determined in a fourth voltage determination step 130, LEDs 102-106 are turned on in a three LED energizing step 132. Similarly, following fourth voltage determination step 130, if a voltage of battery 16 is less than 18.7 volts but greater than 18.2 volts, in a fifth voltage determination step 134 LEDs 102-104 are turned on in a two LED energizing step 136. Finally, in a sixth voltage determination step 138, if the voltage of battery 16 is less than 18.2 volts but greater than 17.7 volts, only first LED 102 is turned on in a one LED energizing step 140.

The battery status check can be performed by the operator of drill driver 10 any time operation of drill driver 10 is initiated, and will repeat the steps noted above depending upon the voltage of the battery cells forming battery 16. For the exemplary steps defined in battery state of charge flow diagram 113, the voltage lookup table 142 of FIG. 9B, which can be saved for example in the memory device/function provided with microcontroller 42 shown and described in reference to FIG. 2, can be accessed for determining the number of LEDs which will be illuminated based on multiple ranges of battery voltages that are measured. It is noted the values identified in voltage lookup table 142 can vary depending upon the voltage and number of cells provided by battery 16.

Additional modes of operation for drill driver 10 can be displayed on display port 80 as follows. For example, either forward or reverse direction of operation for chuck 20 can be indicated as follows. When the forward operating mode is selected, first, fifth, and sixth LEDs 102, 110, 112 will be illuminated. When a reverse or counterclockwise rotation of chuck 20 is selected, fourth, fifth, and sixth LEDs 108, 110, 112 will be illuminated. The color selected for indication of rotational direction can vary from the color selected for the battery status check. For example, the color indicated by the LEDs during indication of the rotational direction can be blue or a combination color of blue/green. Similar to the indication provided for the battery status check, a live torque reading selected during rotation of rotary member 36 will illuminate either one or multiple successive ones of the LEDs depending upon the torque level selected. For example, at a minimum torque level only first LED 102 will be illuminated. At a maximum torque level all six of the LEDs 102-112 will be illuminated. Individual ones of the LEDs will successively illuminate as rotary member 36 is axially rotated between the minimum and the maximum torque command settings. Oppositely, the number of LEDs illuminated will reduce successively as rotary member 36 is oppositely rotated, indicating a change in torque setting from the maximum toward the minimum torque command setting. When there are more settings than the number of LEDs available, combination colored LEDs can be illuminated such as blue/green. The LEDs of display port 80 will also perform additional functions related to operation of chuck 20, which will be described in greater detail with reference to clutch operating modes to be further described herein.

In another aspect of this disclosure, the drill driver 10 is configured to operate in different modes. For example, the drill driver 10 may provide an input component (e.g., rotary member 36) that enables the tool operator to select a clutch setting for an electronic clutch. In one embodiment, the operator selects between a drill mode and a drive mode. In a drill mode, the amount of torque applied to the output spindle is ignored and transmission of torque is not interrupted by the controller 42 during tool operation; whereas, in a drive mode, torque applied to the output spindle is monitored by the controller 42 during tool operation. The controller 42 may in turn interrupt transmission of torque to the output spindle under certain tool conditions. For example, the controller may determine when a fastener being driven by the tool reaches a desired stopping position (e.g. flush with the workpiece) and terminate operation of the tool in response thereto without user intervention. It is readily understood that the selected clutch setting can be implemented by the controller 42 with or without the use of a mechanical clutch. That is, in some embodiments, the drill driver 10 does not include a mechanical clutch.

Figure 11A:
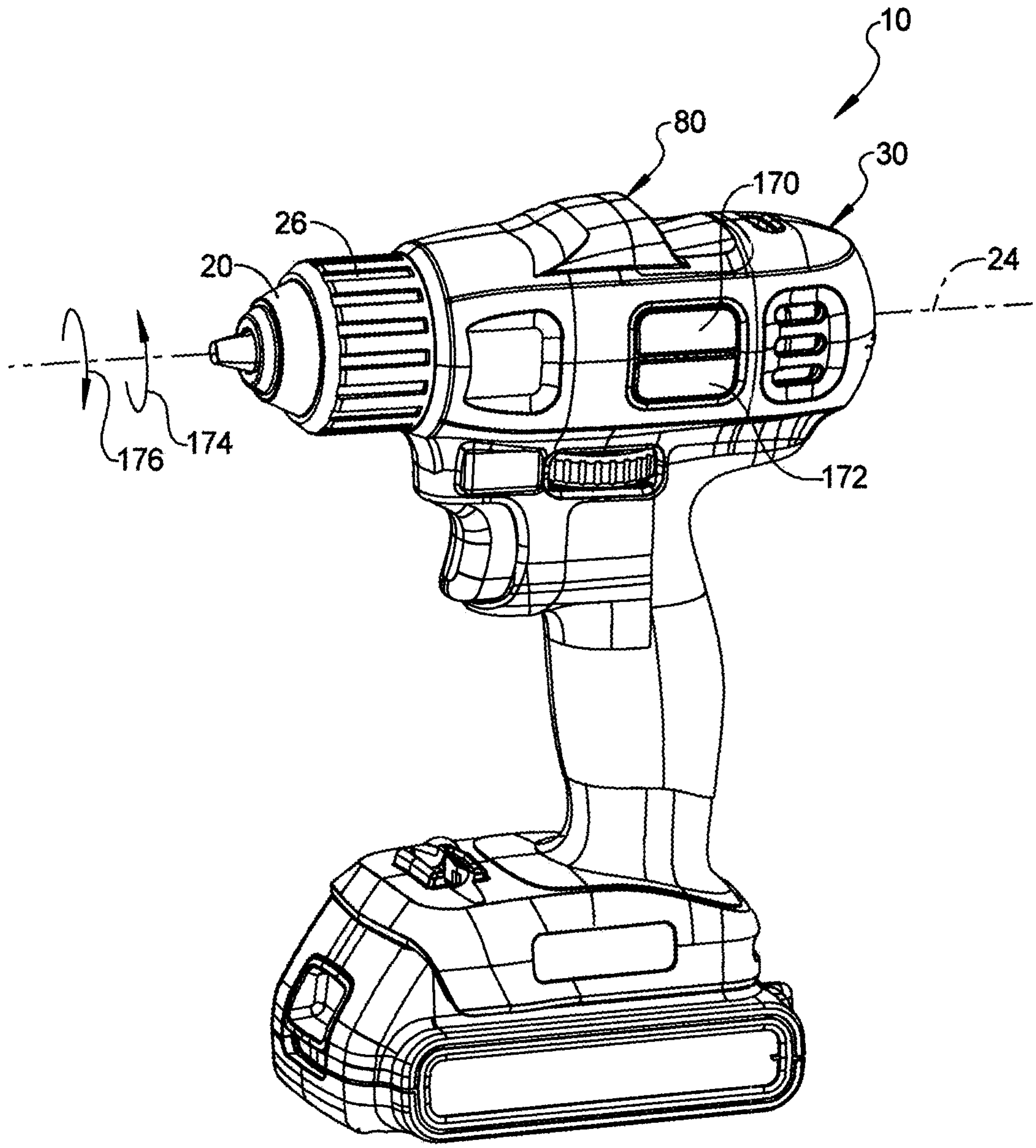
FIG. 11A is a front left perspective view of the drill/driver of FIG. 1.

Referring to FIG. 11A, drill driver 10 can include individual switches for operator selection between either a drill mode or a drive mode. A drill selector switch 170 is depressed when drill operating mode is desired. Conversely, a drive selector switch 172 is depressed when drive operating mode is desired. The drill and drive operating modes are both operable with drill driver 10 regardless of the rotating direction of chuck 20. For example, operation in both the drill mode and drive mode are possible in a clockwise or forward rotational direction 174 and also in a counter clockwise or reverse rotational direction 176 of chuck 20. It is further noted that the selected one of either drill selector switch 170 or drive selector switch 172 may illuminate upon depression by the user. This provides further visual indication of the mode selected by the user.

Drill selector switch 170 and drive selector switch 172 may be actuated in different sequences to activate other tool operating modes. For example, the drive selector switch 172 may be pushed and held for a fixed period of time (e.g., 0.15 sec) to activate a high torque drive mode; whereas, pushing the driver selector switch 172 twice in the fixed period of time may activate a low torque drive mode. To indicate the different drive modes, the driver selector switch 172 may be lit steady when in the high torque drive mode and blinking when in the low torque drive mode. These two sequences are merely illustrative and other combinations of sequences are envisioned to activate these or other tool operating modes.

Figure 11B:
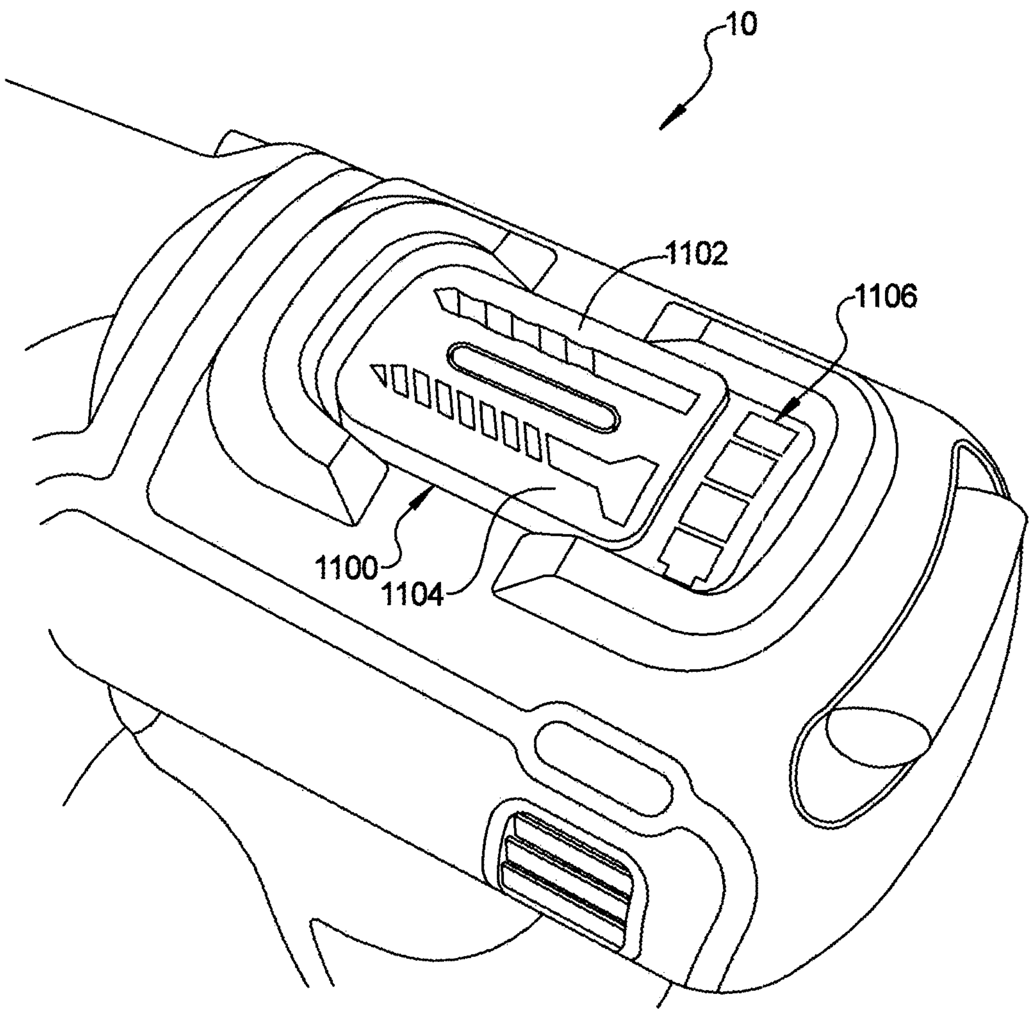
FIG. 11B is a top view of the drill/driver depicting an alternative display interface for selecting between a drill mode and a drive mode.

FIG. 11B depicts an alternative display interface 1100 for selecting between a drill mode and a drive mode. In this embodiment, the buttons for selecting the operating mode are integrated into the top surface of the drill driver housing. A drill icon 1102 is used to represent the drill mode; whereas, a screw icon 1104 is used to represent the drive mode although other types of indicia may be used to represent either of these two operating modes. Once selected by the tool operator, the mode is activated (i.e., a signal is sent from the button to the controller) and an LED behind the button is lit to indicate which operating mode has been selected. The LED lights the icon which remains lit until the operating mode is changed, the tool becomes inactive or is otherwise powered down. The display interface may also include LEDs 1106 for indicating the state of charge of the battery in a similar manner as described above.

Figure 11C:
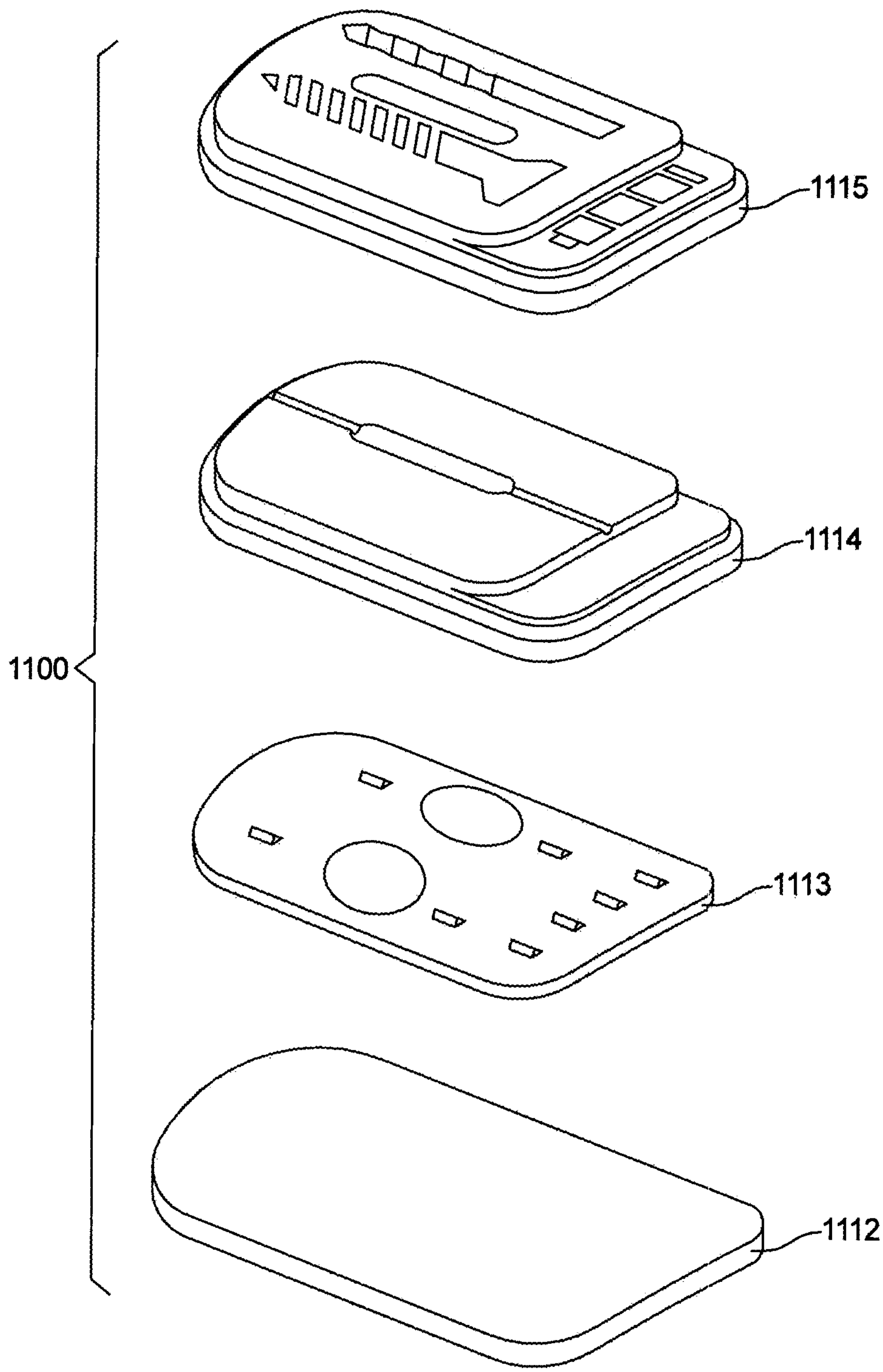
FIG. 11C is an exploded view of the alternative display interface module.

An exemplary construct for the display interface is further illustrated in FIG. 11C. The display interface module is comprised of a plastic carrier 1112, a flexible circuit board 1113, and a translucent rubber pad 1114. The carrier 1112 serves to hold the assembly together and attaches to the top of the housing. The circuit board 1113 supports the switches and LEDs and is sandwiched between the rubber pad 1114 and the carrier 1112. The rubber pad is painted black and laser etched to form the icon shapes thereon.

Figure 12A:
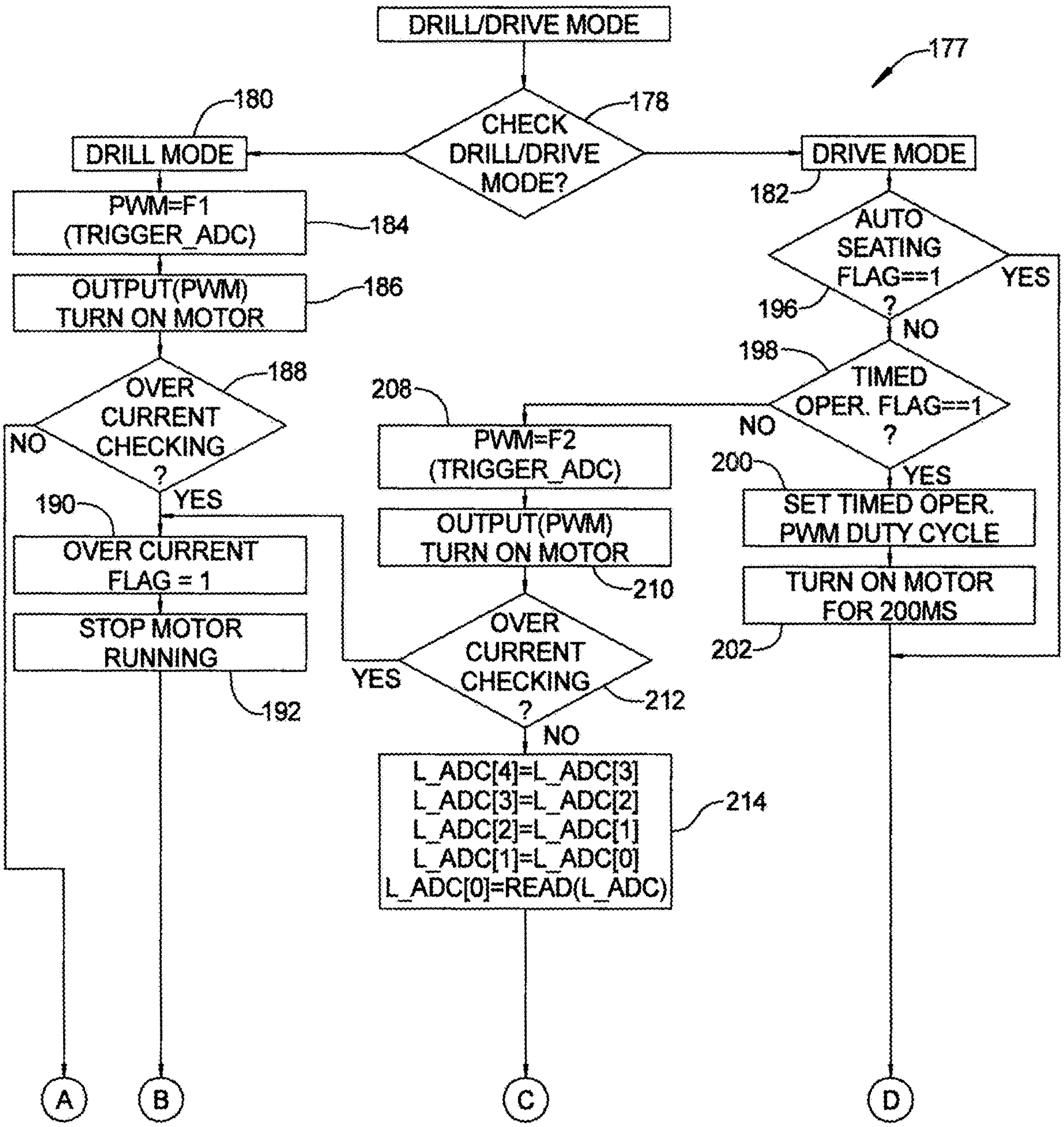
FIGS. 12A and 12B are first and second portions of a flow diagram of the operating steps differentiating the drill mode from the drive mode, including use of algorithms.
Figure 12B:
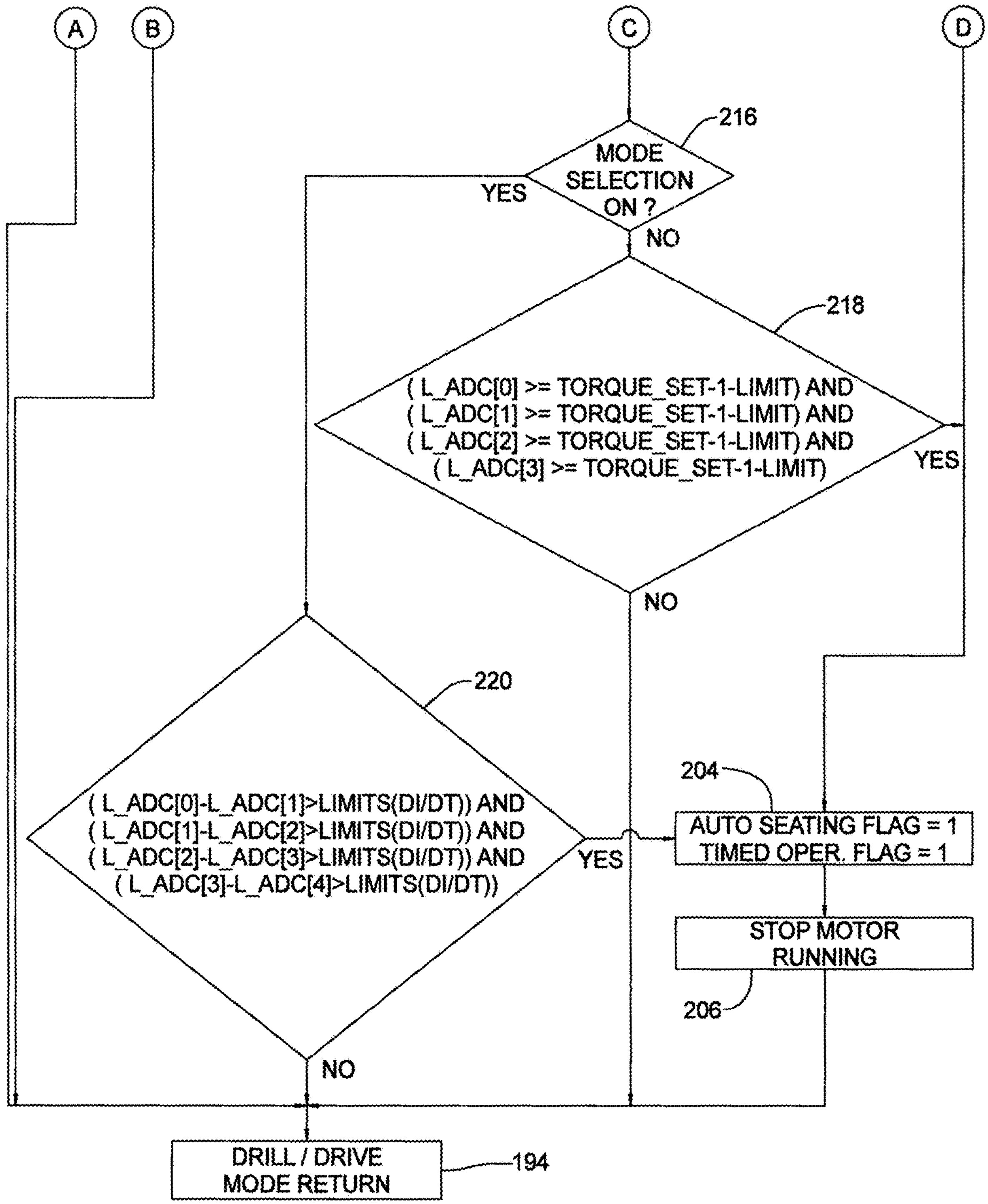

Referring to FIGS. 12A and 12B and again to FIG. 11, a drill/drive mode flow diagram 177 defines steps taken by the control circuit of drill driver 10 distinguishing between a drill mode 180 and a drive mode 182. In an initial check mode step 178, the status of drill selector switch 170 and/or drive selector switch 172 is checked to determine which input is received by the user. If the check mode step 178 indicates that drill mode 180 is selected, a trigger actuation first function 184 is initiated when trigger 28 is depressed. Following trigger actuation first function 184, a motor start step 186 is performed, thereby initiating operation of motor 34. During operation of the motor 34, an over-current check step is performed to determine if motor 34 is operating above a predetermined maximum current setting. If the over-current indication is present from motor over-current check 188, an over current flag 190 is initiated followed by a stop motor step 192 where electrical power to motor 34 is isolated. A drill drive mode return step 194 is then performed wherein continued operation of motor 34 is permitted after the user releases trigger 28. Returning to the motor over-current check 188, if an over-current condition is not sensed during the motor over-current check 188, continued operation of motor 34 is permitted.

With continuing reference to drill/drive mode flow diagram 177, when driver selector switch 172 is depressed by the user and drive mode 182 is entered, a check is performed to determine if an auto seating flag 196 is indicated. If the auto seating flag 196 is not present, the following step determines if a timed operating system flag 198 is present. If the timed operating system flag 198 is present, in a next duty cycle setting step 200 a timed operating duty cycle is set. Following step 200, motor 34 is turned on for a predetermined time period such as 200 ms (milliseconds) in a timed operating step 202. Following timed operating step 202, in a seating/timed operating flag indication step 204, the control system identifies if both an auto seating flag and a timed operating flag are indicated. If both the auto seating flag and timed operating flag indication step 204 are indicated, operation of motor 34 is stopped in a stop motor running step 206.

Returning to timed operating system flag 198, if the flag is not present, a trigger activation second function 208 is performed which initiates operation of motor 34 in a timed turn on motor start 210. Following this and similar to motor over-current check 188, a motor over-current check 212 is performed. If an over-current condition is not indicated, a first routine 214 algorithm is actuated followed by a selection "on" check 216. If the selection "on" check 216 is negative, a second torque routine 218 algorithm is run, following which if a positive indication is present, returns to the seating/timed operating flag indication; and if negative, returns to the return step 194. If the selection "on" check performed at step 216 is positive, a third routine 220 algorithm is run which if positive thereafter returns to seating/timed operating flag indication step 204 and, if negative, returns to return step 194.

In some embodiments, the drive mode may divided into an automated drive mode and one or more user-defined drive modes, where each of the user-defined drive modes specify a different value of torque at which to interrupt transmission of torque to the output spindle. In the automated drive mode, the controller monitors the current being delivered to the motor and interrupts torque to the output spindle in response to the rate of change of current measures. Various techniques for monitoring and interrupting torque in an automated manner are known in the art, including techniques to setting a fastener in a workpiece, and fall within the broader aspects of the disclosure. An improved technique for detecting when a fastener reaches a desired stopping position is further described below. In such embodiments, it is readily understood that the input component may be configured for selection amongst a drill mode, an automated drive mode and one or more user-defined drive modes.

Figure 10:
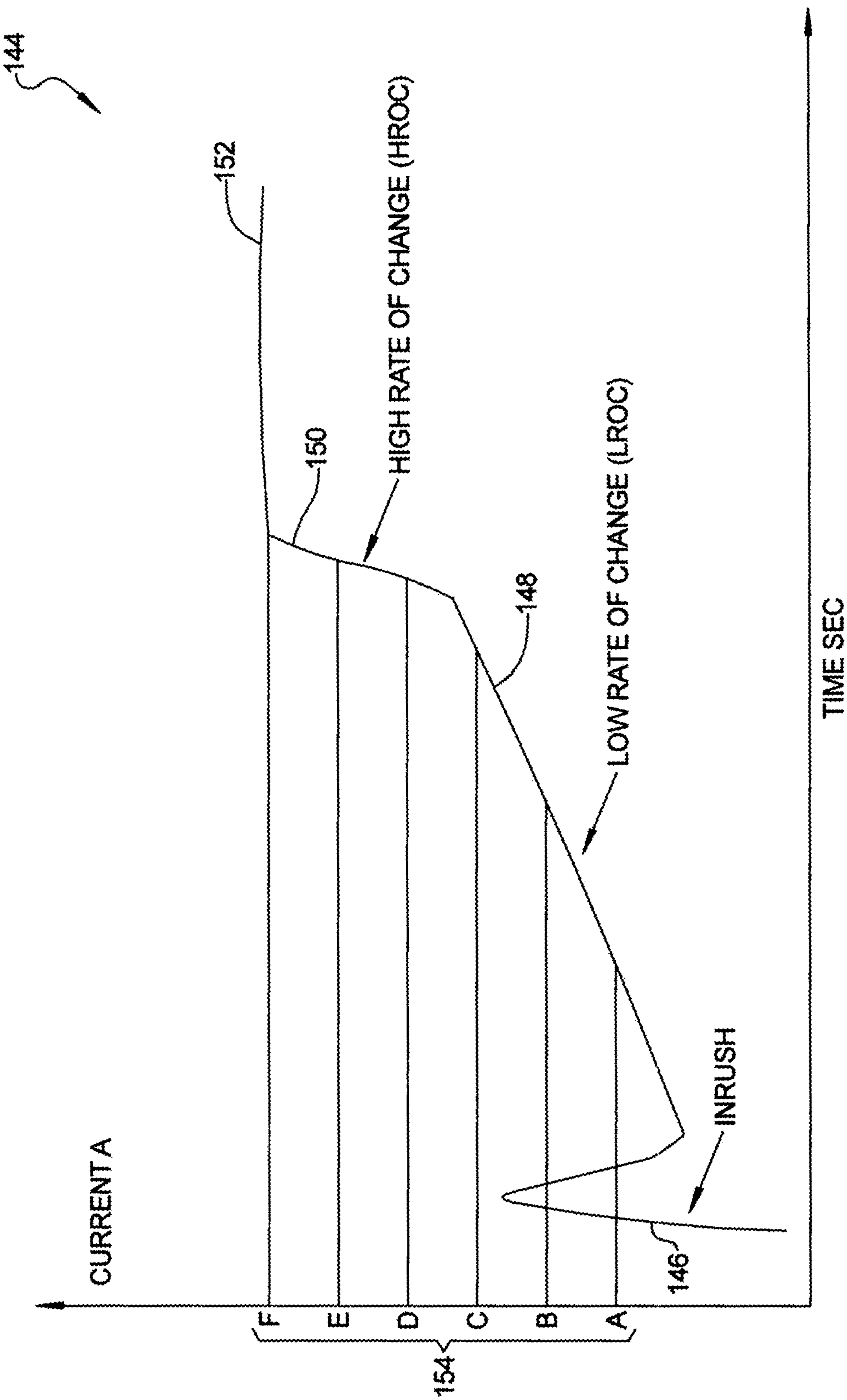
FIG. 10 is a current vs. time graph depicting a change in current rate during operation in a drive mode.

Referring to FIG. 10 and again to FIGS. 1 and 2, a current versus time graph 144 defines a typical motor current draw during operation to install a fastener using drill driver 10. Initially, an inrush current 146 briefly peaks prior to the current draw continuing at a low rate of change (LROC) current 148. LROC current 148 corresponds to a body of a fastener such as a screw penetrating a material such as wood at a constant speed. At the time when a head of the fastener contacts and begins to enter the wood, the current draw changes to a high rate of change (HROC) current 150 for a brief period of time until a current plateau 152 is reached, defining when the fastener head is fully embedded into the wood. As is known, the level of current draw is proportional to the torque created by motor 34.

In a selected one of the user-defined drive modes, the controller sets a value of a maximum current threshold in accordance with the selected one of the user-defined drive modes and interrupts torque to the output spindle in response to the current measures exceeding the maximum current threshold. For example, the user selects one of the user-defined drives modes as the desired clutch setting using, for example rotary member 36. Current levels 154 designated as "a", "b", "c", "d", "e", "f" correlate to the plurality of predefined torque levels designated as "1", "2", "3", "4", "5", "6", respectively. During tool operation, the controller 42 will act to terminate rotation of the chuck when the current monitored by the controller 42 exceeds the current level associated with the selected user-defined drive mode (i.e., torque setting). The advantage of providing both types of drive modes (i.e., control techniques) within drill driver 10 includes the use of current level increments 154 which, based on prior operator experience, may indicate an acceptable predetermined torque setting for operation of chuck 20 in a specific material. Where the user may not be familiar with the amount of fastener headset in a particular material and/or with respect to a particular sized fastener, the automatic analysis system can be selected, providing for acceptable setting of the fastener which may occur in-between individual ones of the current level increments 154.

Figure 24:
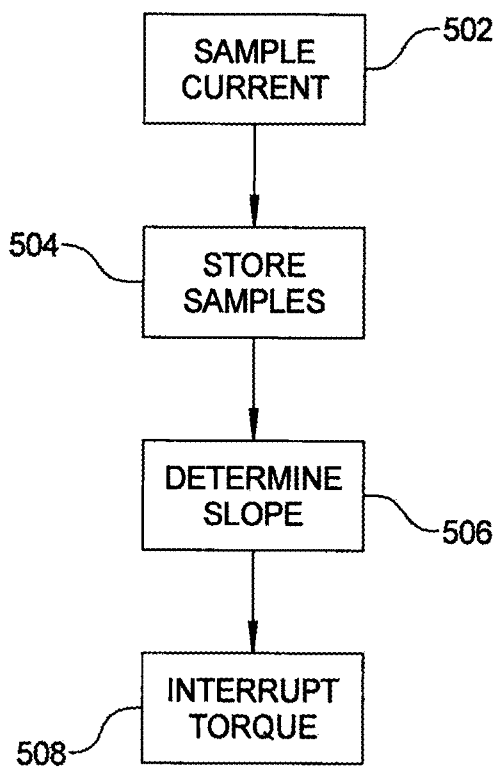
FIG. 24 is a flowchart illustrating an improved technique for setting a fastener in a workpiece.

FIG. 24 illustrates an improved technique for controlling operation of the drill driver when driving a fastener. Briefly, the current delivered to the electric motor is sampled periodically at 502 by the controller of the drill driver. The current measures most recently sampled by the controller are stored at 504 in a memory of the drill driver. From the most recently sampled current measures, a slope for the current measures is determined at 506 by way of linear regression. Linear regression is used because it has a better frequency response making it more immune to noise as compared to conventional computation methods. When a fastener being driven by the drill driver reaches a desired stopping position, torque transmitted to the output shaft is interrupted at 508 by the controller. The desired stopping position is determined based in part on the slope of the current measures as will be further described below.

Figure 25:
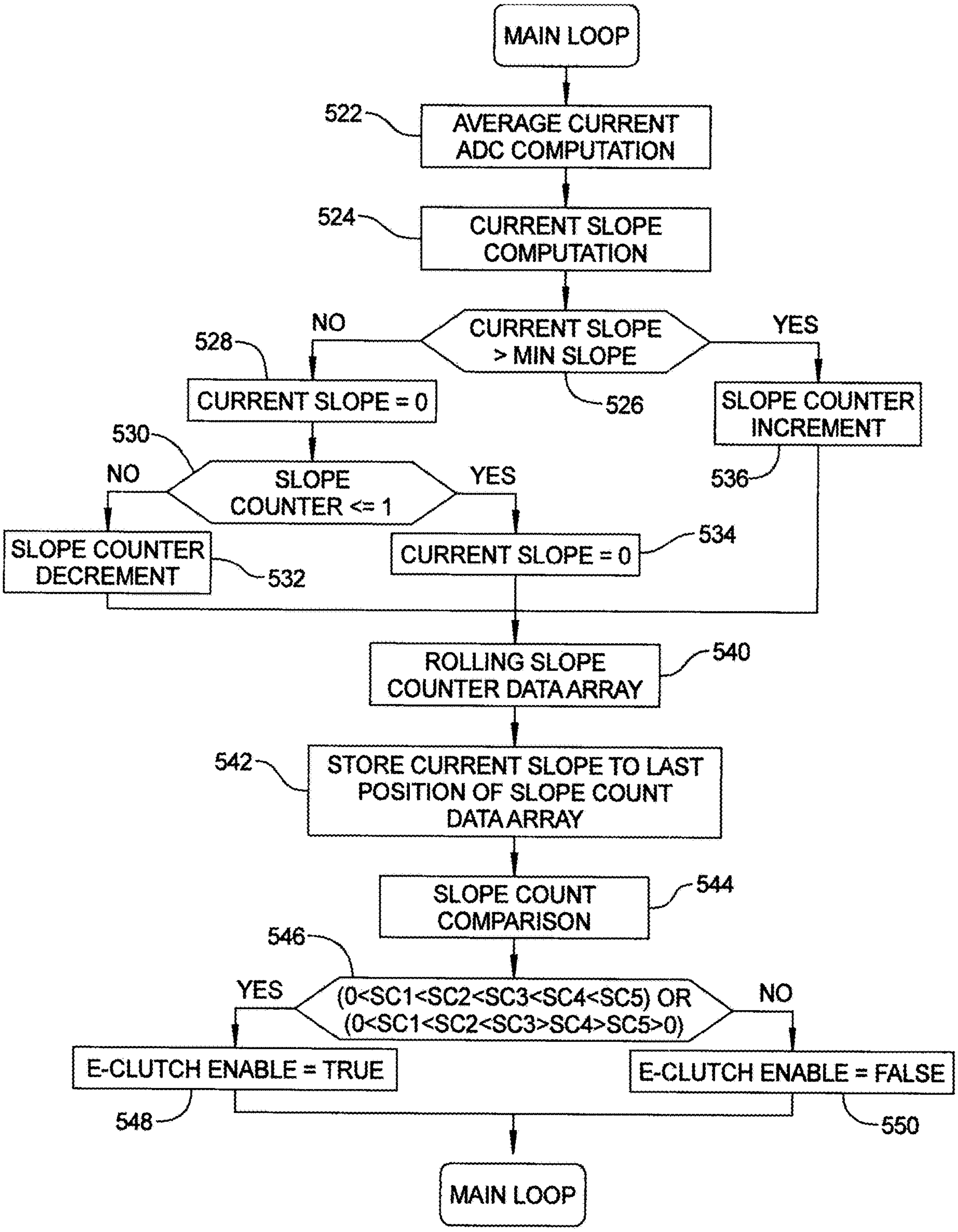
FIGS. 25 and 26 are diagrams depicting an exemplary embodiment for controlling operation of the drill driver to set a fastener.
Figure 26:
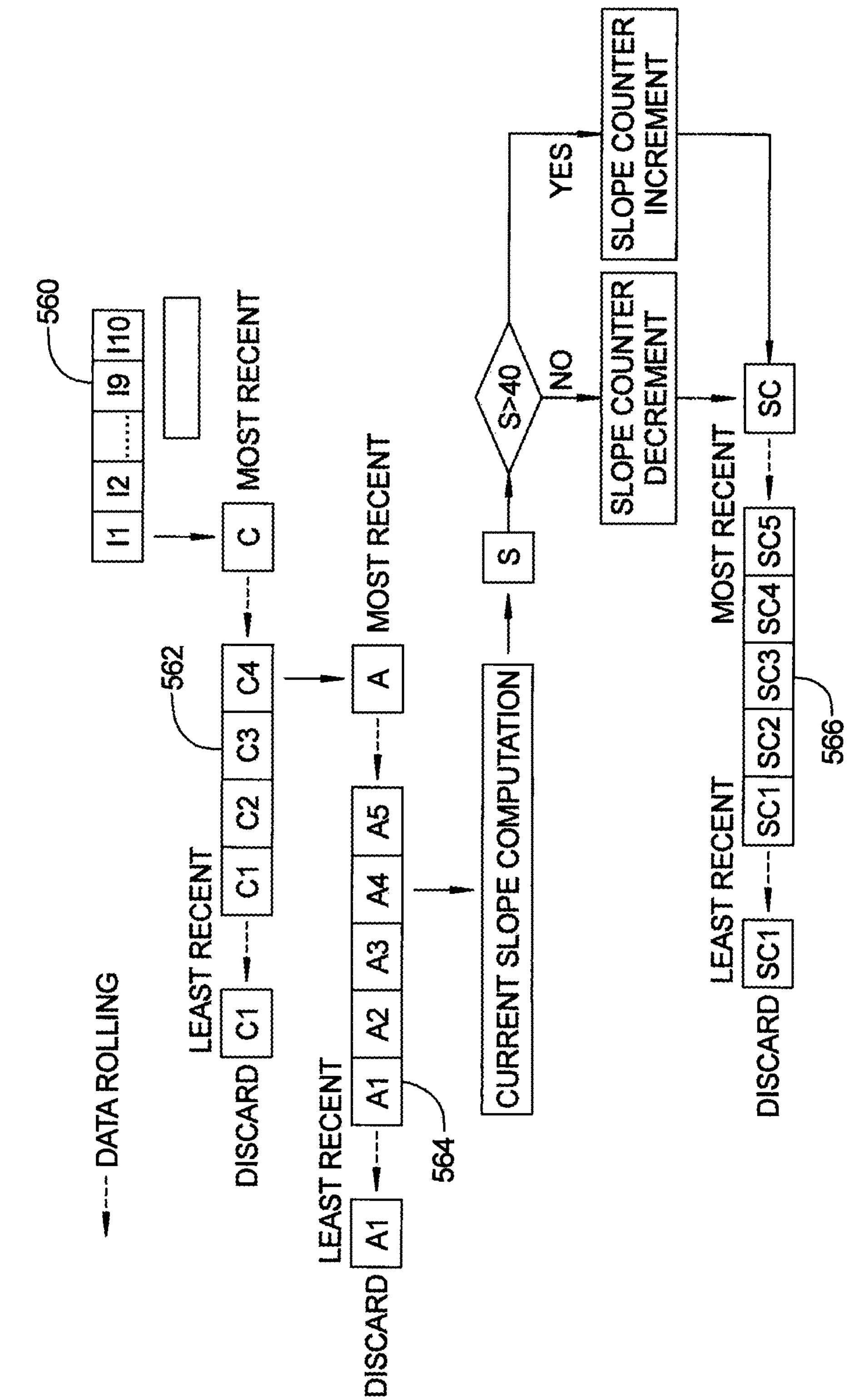

FIGS. 25 and 26 further illustrating an automated technique for setting a fastener in a workpiece. Current delivered to the electric motor is sampled periodically by the controller of the drill driver. In an example embodiment, the controller can ignore current samples captured during an inrush current period (e.g., 180 ms after trigger pull). Whenever there is a change in the trigger position (i.e., change in PWM duty cycle), the controller will stop sampling the current until the inrush current period has lapsed. In some embodiments, the automated technique is implemented by the controller regardless of the position of the trigger switch. In other embodiments, the automated technique is only implemented by the controller when the trigger position exceeds a predefined position threshold (e.g., 90%). Below this position threshold, the tool operates at lower speeds, thereby enabling the tool operator to set the fastener to the desired position without the need for the automated technique.

Current measures may be digitally filtered before computing the current change rate. In an example embodiment, current is sampled in 15 milliseconds intervals. During each interval, the controller will acquire ten current measures as indicated at 560 and compute an average from the ten measures although more or less measures may be acquired during each interval. The average for a given interval may be considered one current sample and stored in an array of current samples indicated at 562 in FIG. 26, where the array of current samples stores a fixed number (e.g., four) of the most recently computed values. The controller will then compute an average from the current samples in the array of current samples. The average for the values in the array of current samples is in turn stored in a second array as indicated at 564 in FIG. 26, where the second array also stores a fixed number (e.g., five) of the most recently computed averages. These averaged current measures can then be used to determine the rate of current change. Other techniques for digitally filtering the current measures are also contemplated by this disclosure.

With continued reference to FIG. 25, the slope of the current is determined at 524 from the digitally filtered current measures. In an example embodiment, a linear regression analysis is used to compute the slope. In a scatter plot, the best fit line of the scatter data is defined by the equation y=a+bx, where the slope of the best fit line can be defined as $$b = \frac{\sum xy - (\sum x \sum y)/n}{\sum x^2 - (\sum x)^2/n},$$

where n is the number of data points. The intercept will be ignored in this disclosure. For illustration purposes, assume data scatter plot with current values for y of [506, 670, 700, 820, 890] corresponding to sample values of [1, 2, 3, 4, 5], such that n=5. Using linear regression, the slope b of the best fit line is equal to 91.8. While a simple linear regression technique has been explained, other linear regression techniques are also contemplated by this disclosure.

Slope of the current measures may be used as the primary indicator for when the fastener has been set at a proper depth in the workpiece. Particularly, by using the slope of the current, the tool is able to determine when the tool is in the HROC (of current) area shown in the graph of FIG. 10. In the example embodiment, a slope counter is maintained by the controller. The current slope is compared at 524 to a minimum slope threshold. For example, the minimum slope threshold may be set to a value of 40. This value may be set such that slope values exceeding the minimum slope threshold are indicative of the HROC 150 range shown in FIG. 10. The slope threshold value may be derived empirically for different tools and may be adjusted according to the sampling time, motor attributes and other system parameters. In embodiments where the automated technique is implemented by the controller only when the trigger position exceeds a predefined position threshold, minor variations in trigger position (e.g., 10% from a baseline position) can be ignored once the current slope exceeds the minimum slope threshold and until such time as the fastener has been set and the torque to the output spindle is interrupted.

The slope counter is adjusted in accordance with the comparison of the current slope to the minimum slope threshold. The slope counter is incremented by one when the computed slope exceeds the minimum slope threshold as indicated at 536. Conversely, the slope counter is decremented by one when the computed slope is less than or equals the minimum slope threshold as indicated at 532. When the slope is less than or equal to the minimum slope threshold, the value of the current slope is also set to zero as indicated at 528. In the event the slope counter is equal to zero, the slope counter is not decremented further and the slope counter remains at zero as indicated at 534. Following each adjustment, the value of the slope counter is stored in an array of slope counts as indicated at 566 in FIG. 26, where the array of slope counts stores a fixed number (e.g., five) of the most recent slope count values.

Next, the slope counts are evaluated at 546 in relation to a fastener criteria. The fastener criteria at step 546 includes both a setting criteria, which is indicative of a desired stopping position for the fastener being driven by the tool, and a default criteria. The setting criteria and default criteria may be used together, as shown in 546 of FIG. 25, or only one of the criteria may be used. The setting criteria will be described first. In the setting criteria a fastener is assumed to have reached a desired stopping position when the slope counts increase over a series of values stored in the array of slope counts, where the series of values may be less than or equal to the total number of values stored in the entire array. In this example, each slope count value in the array is compared to an adjacent slope count value starting with the oldest value. The setting criteria is met when each value in the array is less than the adjacent value as compared from oldest value to the most recent value. For example, if the array is designed to hold five slope count values (SC1 through SC5), the setting criteria may be met when the consecutive count values are each increasing—i.e., SC1<SC2<SC3<SC4<SC5. In other words, the setting criteria is satisfied when the controller detects five successive computer slope values greater than the predetermined minimum slope threshold.

As noted above, the setting criteria may not use the entire array of values. For example, the array may be designed to hold five slope count values, but the setting criteria may be set such that an increase of counts over a series of four values (e.g. SC2<SC3<SC4<SC5) is sufficient. Other variations regarding the particular number of counts required are also contemplated.

The fastening criteria evaluated at step 546 may also include a default criteria. In some instances, the setting criteria described above with respect to FIGS. 25 and 26 may fail to trigger due to, for example, an anomaly reading or variations in a workpiece which result in the controller failing to detect the occurrence of the above-described setting criteria. In that case, there may be an additional criteria serving as a default criteria. In the default criteria, a fastener is assumed to have reached, or passed, a desired stopping position when the slope count peaks within a series of values stored in the array. In other words, if after detecting successive slope values that exceed the minimum slope threshold, the controller now detects successive slope values less than the minimum slope threshold, it is apparent the above-described setting criteria will not be met.

As with the setting criteria, the series of values may be less than or equal to the number of values stored in the entire array. In this example, slope count values in the array are again compared to each other. The default criteria is met when the slope count values in the array increase from the oldest value to an intermediate peak value and then decrease from the intermediate peak value to the most recent value. For example, the default criteria may be met if SC1<SC2<SC3>SC4>SC5. Of course, other particular default criteria may be used. For example, the default criteria may require more successive increases or more successive declines than that provided in the example above (e.g., SC1<SC2<SC3<SC4>SC5>SC6>SC7; or SC1<SC2>SC3>SC4; etc.). In this embodiment shown in FIG. 25, the setting criteria and default criteria are used together. However, in an alternative embodiment, each may be used alone. Other types of setting and default criteria are also contemplated by this disclosure.

Torque transmitted to the output spindle is interrupted at 548 when the slope counts meet the setting criteria or default criteria; otherwise, tool operation continues as indicated at 550. Torque may be interrupted in one or more different ways including but not limited to interrupting power to the motor, reducing power to the motor, actively braking the motor or actuating a mechanical clutch interposed between the motor and the output spindle. In one example embodiment, the torque is interrupted by braking the motor, thereby setting the fastener at the desired position. To simulate the electronic clutching function, the user may be subsequently provided with haptic feedback. By driving the motor back and forth quickly between clockwise and counter-clockwise, the motor can be used to generate a vibration of the housing which is perceptible to the tool operator. The magnitude of a vibration is dictated by a ratio of on time to off time; whereas, the frequency of a vibration is dictated by the time span between vibrations. The duty cycle of the signal delivered to the motor is set (e.g., 10%) so that the signal does not cause the chuck to rotate. Operation of the tool is terminated after providing haptic feedback for a short period of time. It is to be understood that only the relevant steps of the technique are discussed in relation to FIG. 25, but that other software-implemented instructions may be needed to implement the technique within the overall operation of the tool.

Figure 27:
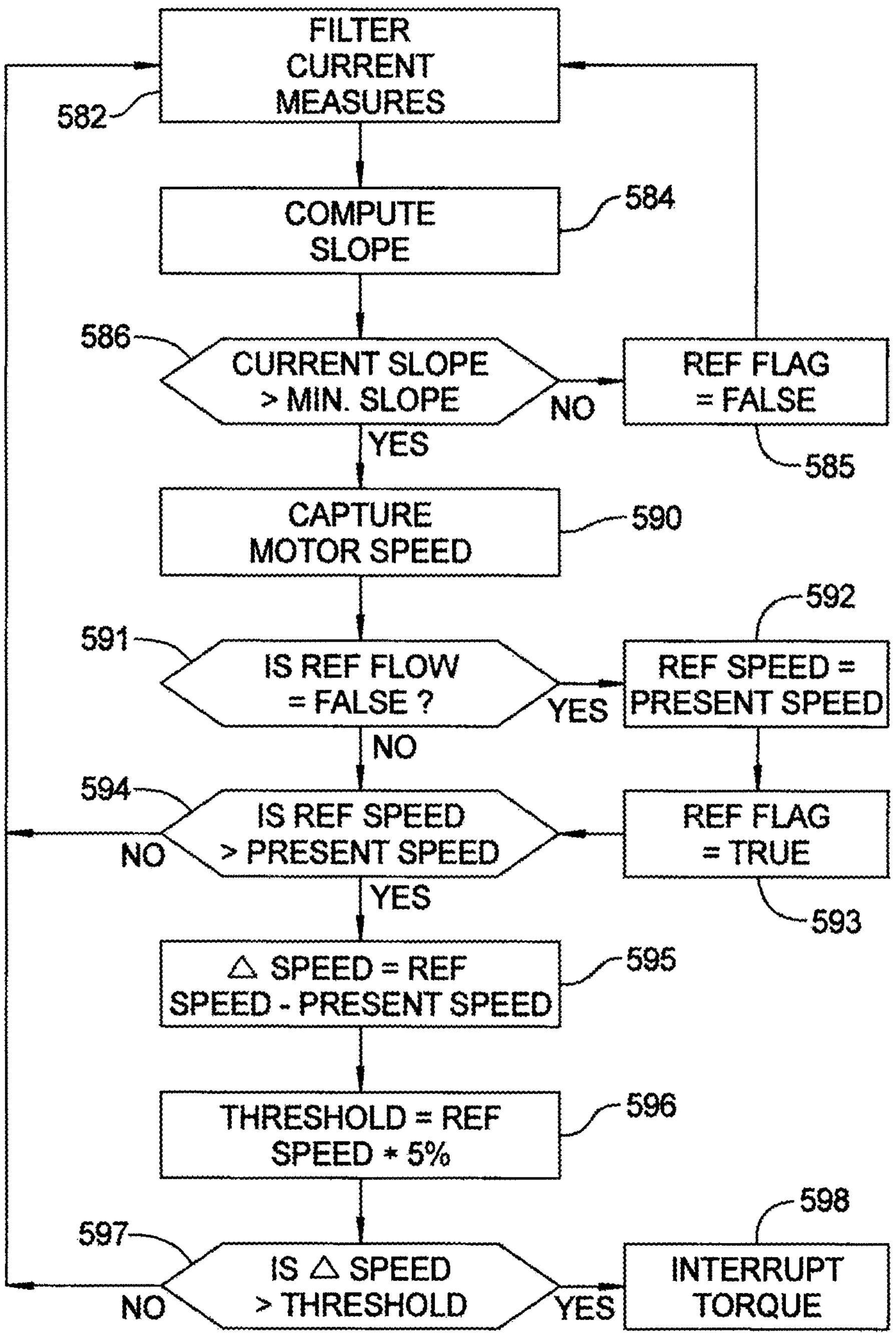
FIG. 27 is a diagram depicting another exemplary embodiment for controller operation of the drill driver to set a fastener.

FIG. 27 illustrates an additional technique for controlling operation of the drill driver when driving a fastener. Current delivered to the electric motor can be sampled and filtered at 582 by the controller in the same manner as described above in relation to FIG. 25. Likewise, the slope of the current samples can be determined at 584 in the manner described above.

In this technique, motor speed is used as a secondary check on whether to interrupt transmission of torque to the output spindle but only when the current slope exceeds a minimum slope threshold. Accordingly, the current slope is compared at 586 to a minimum slope threshold (e.g., with a value of 40). The secondary check proceeds at 588 when the current slope exceeds the minimum slope threshold; otherwise, processing continues with subsequent current sample as indicated at 582.

To perform the secondary check, motor speed is captured at 588. In one example embodiment, motor speed may be captured by a Hall effect sensor disposed adjacent to or integrated with the electric motor. Output from the sensor is provided to the controller. Other types of speed sensors are also contemplated by this disclosure.

In the example embodiment, the controller maintains a variable or flag (i.e., Ref_RPM_Capture) to track when the current slope exceeds the minimum slope threshold. The flag is initially set to false and thereafter remains false while the present slope is less than the minimum slope threshold. At the first occurrence of the current slope exceeding the minimum slope threshold, the flag is false and the controller will set a reference motor speed equal to the present motor speed at 592. The reference motor speed is used to evaluate the magnitude of decrease in motor speed. In addition, the flag is set to true at 593 and will remain set to true until the current slope is less than the minimum slope threshold. For subsequent and consecutive occurrences of the current slope exceeding the minimum slope threshold, the flag remains set to true and reference speed is not reset. In this way, the flag (when set to true) indicates that preceding slope values have exceeded the minimum slope threshold.

Next, the present speed is compared at 594 to the reference speed. When the motor is slowing down (i.e., the reference speed exceeds the present speed), a further determination is made as to the size of the decrease. More specifically, a difference is computed at 595 between the reference speed and the present motor speed. A difference threshold is also set at 596 to be a predefined percentage (e.g., 5%) of the reference speed. The predefined percentage can be derived empirically and may vary for different tool types. The difference is then compared at 597 to the difference threshold. Processing of subsequent current sample continues until the difference between the reference speed and the present speed exceeds the difference threshold as indicated at 597. Once the difference between the reference speed and the present speed exceeds the difference threshold (and while the motor speed is decreasing), transmission of torque to the output spindle is interrupted at 598. It is to be understood that only the relevant steps of the technique are discussed in relation to FIG. 25, but that other software-implemented instructions may be needed to implement the technique within the overall operation of the tool. Furthermore, the secondary check described above in relation to FIG. 27 is intended to work cooperatively (e.g., in parallel with) the technique described in FIGS. 25 and 26. It is also envisioned that this technique may be implemented independent from the technique described in FIGS. 25 and 26 as a method for automatically setting a fastener in a workpiece.

Figure 13:
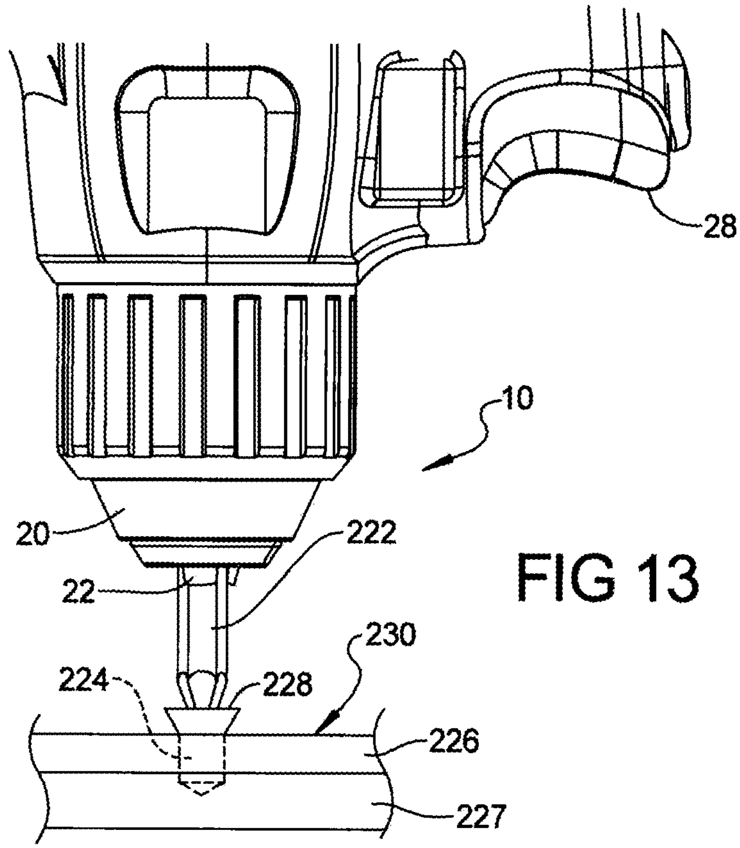
FIG. 13 is a left side elevational view of the drill/driver of FIG. 1 during installation of a fastener through two components.

Referring to FIG. 13 and again to FIGS. 1-6, when the user places the drill driver 10 in a clutch mode by manual rotation or operation of the rotary member 36 of rotary potentiometer/switch assembly 32, and positions a tool such as a setting tool 222 in clutch jaws 22 of chuck 20, a first fastener 224 can be driven into first and second components 226, 227 to join the first and second components 226, 227. Subsequent operation of trigger 28 permits installation of first fastener 224 to a desired depth or degree of head seating for a fastener head 228 in relation to a component surface 230 of first component 226. Because different screws have different characteristics, the drill driver 10 may enable the user to rough tune the fastener setting algorithm. For example, the current change rate threshold for a shorter screw may be lower than for a longer screw. To accommodate such differences, the drill driver 10 may provide two or more different user-actuated buttons that allow the user to tune the fastener setting algorithm. Continuing with the example above, one button may be provided to a shorter screw and one button may be provided for a longer screw. The current change rate threshold may be adjusted depending upon which button is actuated by the tool operator before an installation operation. It is readily understood that other parameters of the fastener setting algorithm or the tool (e.g., motor speed) may be adjusted in accordance with button actuation. Moreover, more or less buttons may be provided to accommodate different fastener characteristics or installation conditions.

After completing installation of first fastener 224 such that fastener head 228 contacts component surface 230, it is often desirable to install a second or more fasteners to couple the first and second components 226, 227. Referring to FIG. 14 and again to FIGS. 12 and 13, drill driver 10 can further include a control feature zone 232 positioned, for example, at an upper facing surface of motor housing 30. Control feature zone 232 can include a plus (+) button 234 and a minus (−) button 236, as well as a memory store button 238. After completing installation of first fastener 224, the user can press the memory store button 238 to record an amperage draw that was required to seat first fastener 224.

Figure 15:
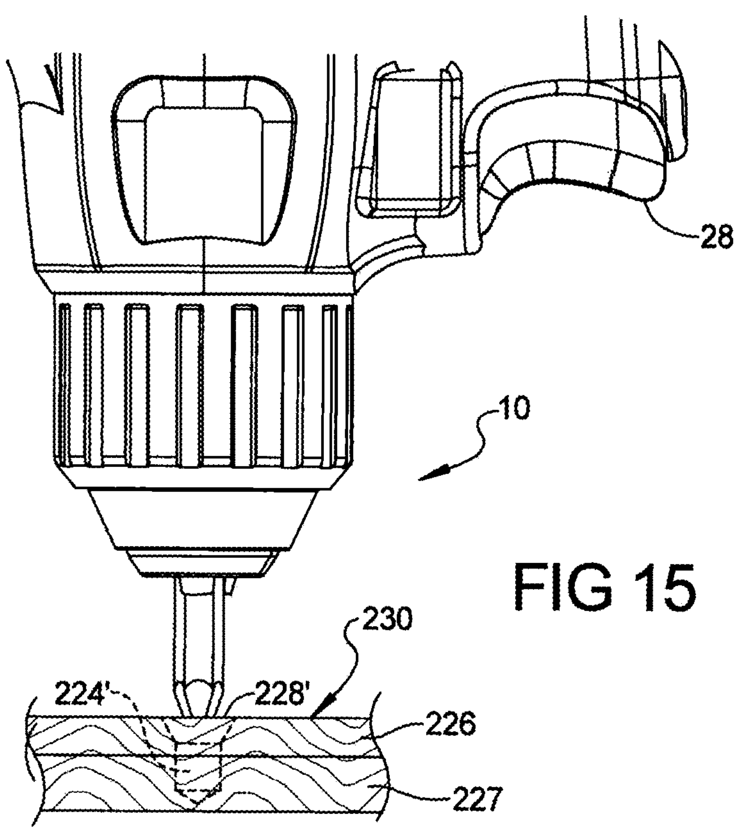
FIG. 15 is a partial cross sectional left side elevational view of the drill/driver of FIG. 13.

Referring to FIG. 15 and again to FIGS. 1-2 and 12-14, to install a second or subsequent fastener 224', the user again presses the memory store button 238 and actuates trigger 28 to begin installation of second fastener 224'. The electronic control circuit of PCB 40 senses when the current draw that equals the current draw stored in the memory feature of microcontroller 42 is again reached during the installation of fastener 224' and provides feedback to the user that fastener 224' has seated in a similar manner as first fastener 224. As previously noted, the current draw for installation of each of the fasteners 224, 224' can be equated to a torque force required to drive the fastener. After the control circuit identifies that fastener 224, 224' is nearly seated based on the torque level sensed, the control circuit can vary the feedback to allow the user better control in stopping installation of fastener 224' at the appropriate time and/or depth.

The feedback provided to the user can be manipulated as follows. First, the output of motor 34 can be stopped. Second, the speed of motor 34 can be reduced. For example, the speed of motor 34 can be reduced from approximately 600 rpm to approximately 200 rpm. This reduction in operating speed provides the user with visible feedback on the rate at which the fastener is being installed and provides additional time for the user to respond to how far fastener 224' is being set into the first and second components 226, 227. Third, operation of motor 34 can be ratcheted, for example by pulsing motor 34 on and off to provide discreet, small rotations of the fastener 224'. This acts to slow down the average rotation speed of chuck 20, providing the user more control in setting the depth of penetration of fastener 224'. This could also function as an indication to the user that fastener installation is nearly complete and that the drill driver 10 has changed operating mode. In addition, ratcheting of motor 34 also provides a sensation to the user similar to a mechanical clutch operation. Fourth, the varied output of motor 34 from the above second and third operations can continue indefinitely or could continue for a fixed period of time and then stop. For example, the varied output of motor 34 can continue until the user releases trigger 28.

Figure 14:
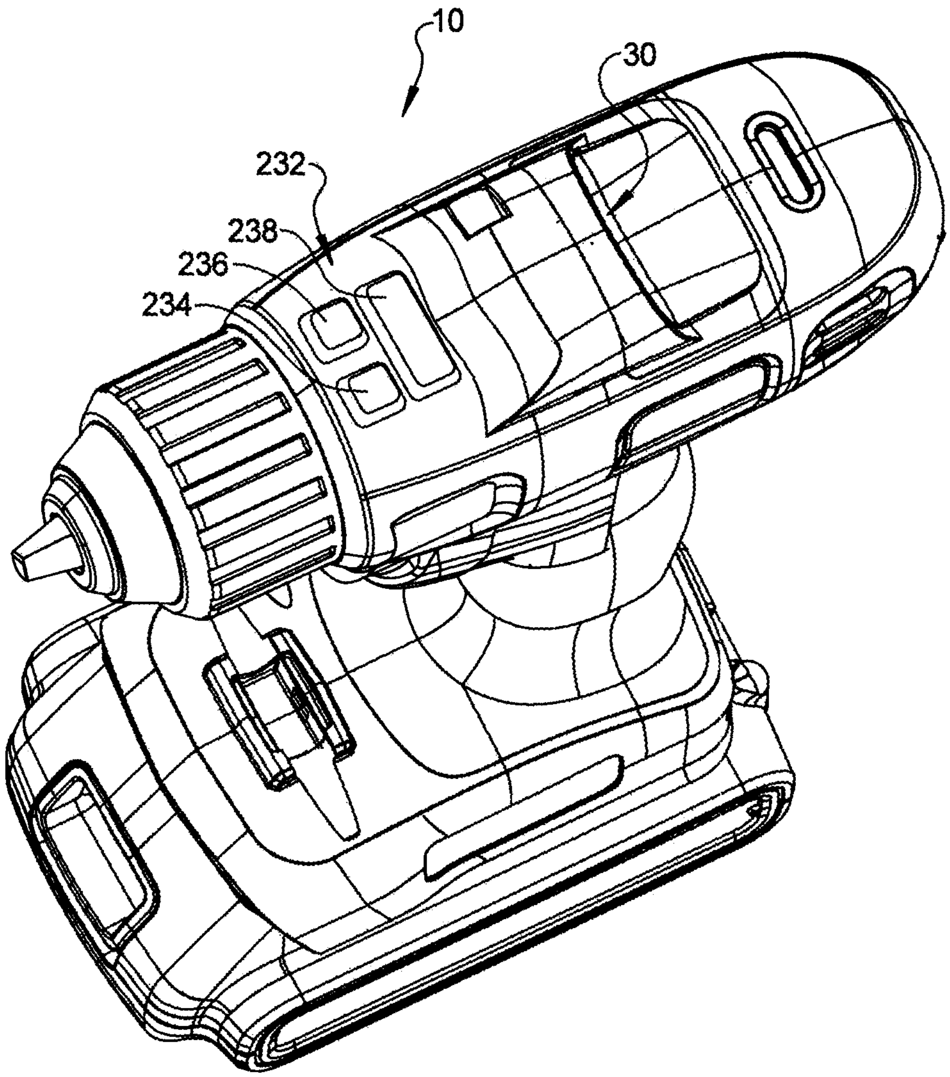
FIG. 14 is a top left perspective view of the drill/driver of FIG. 1.

With continuing reference to FIG. 14, in addition to the memory storage feature provided by memory store button 238, the user can use either the plus button 234 or the minus button 236 to fine tune a current draw limit in response to slight variations in either the fastener and/or the first or second component 226, 227. For example, if the user identifies that the amperage draw saved using memory store button 238 after installation of the first fastener 224 does not seat the fastener head 228 of second fastener 224' to an acceptable degree, the user can press the plus button 234 to incrementally increase a cutout level of current load provided to motor 34. Similarly, but to an opposite extent, the minus button 236 can be depressed to incrementally decrease the cutout level of current load. The features provided by plus button 234, minus button 236, and memory store button 238 are available in either drill or drive mode. These features allow the user to fine tune the operation of drill driver 10 over a wide variety of materials, such as wood, plywood, particle board, plastics, metal, and the like, for which universal limits cannot be established.

Referring again to FIGS. 12 and 14 as well as to FIGS. 1 and 2, in the event that operation of motor 34 stops before fastener head 228 is completely engaged or parallel with respect to component surface 230, a timed operation mode is available to complete the installation of fastener 224 which provides an automatic period of operating time for motor 34, thereby eliminating the need for the user to estimate the time or degree of rotation of chuck 20 to achieve full setting of fastener 224. When operation of motor 34 ceases and the user releases trigger 28, if the user visually recognizes that additional displacement of fastener 224 is required, and if the user subsequently depresses trigger 28 within a predetermined time period after the motor 34 has ceased operation, a timed operation mode is automatically engaged. The predetermined time period for initiation of the timed operation mode can be varied, but can be set, for example, at a period of time of approximately one second. Therefore, if the user recognizes that additional driving force is required to seat fastener 224' and again depresses trigger 28 within approximately one second of the stop of motor 34, motor 34 is again energized to rotate chuck 20 for a period of time approximating 200 ms of chuck 20 rotation. If the first operation in timed operation mode is not sufficient to fully seat fastener 224, and the user releases trigger 28 and again depresses trigger 28 within approximately one second, a second or subsequent timed operation mode operation of approximately 200 ms will occur. The number of timed operation mode operations is not limited; therefore, the user can continue in this mode provided that trigger 28 is depressed within the minimum time period required. The timed operation mode will time-out if the user does not again depress trigger 28 within the predetermined time period, such as the exemplary one second time period described above. Following the time-out of the timed operation mode operation, the drill driver 10 will return to normal or the previous operating mode based on the parameters previously set by the user.

Referring to FIG. 16 and again to FIGS. 12, 14, and 1-2, a timed operation mode flowchart identifies the various steps of operation of the electronic control circuit of drill driver 10 providing for timed operation mode control. Initially, with drill driver 10 in drive mode, when the user releases trigger 28 the control circuit searches for a timed operation flag 242. If the timed operation flag 242 is present, indicating that the user has re-depressed trigger 28 within a predetermined time period (for example 1 second), a timed operation duty cycle set step 244 is performed which subsequently directs, via a motor turn on step 246, motor 34 to energize for a predetermined time period (for example 200 ms) of chuck 20 rotation. As motor 34 operates in the timed operation mode, following indication by a counter that timed operation has been completed, in a stop motor step 248 motor 34 is de-energized. After motor 34 is de-energized, an increase switch hold counter step 250 initiates, which will allow further operation in the timed operation mode if trigger 28 is again depressed within the predetermined time period. In a switch check step 252, a check is performed to identify if an analog digital converter (ADC) switch controlled by trigger 28 is still closed while an additional increase switch hold counter step 250 is performed. If the switch check step 252 indicates that the trigger 28 has been released, a first comparison step 254 is performed wherein a switch hold counter is compared to a normal hold counter to determine if the switch hold counter is less than the normal hold counter. If the switch hold counter in first comparison step 254 is not less than the normal hold counter, a subsequent second comparison step 256 is performed wherein it is determined if the switch hold counter is greater than the normal hold counter. If, as a result of the second comparison step, the switch hold counter is not determined to be greater than the normal hold counter, the timed operation mode is ended. Returning to the timed operation flag 242 initially queried at the start of the timed operation mode, if timed operation flag 242 is not present, the timed operation mode cannot be initiated.

Returning to the first comparison step 254, if the switch hold counter is less than the normal hold counter, a decrease counter step 258 is performed wherein the timed operation time delay counter is decreased. Returning to the second comparison step 256, if the switch hold counter is greater than the normal hold counter, an increase counter step 260 is performed wherein the timed operation time delay counter is increased. Following either the decrease counter step 258 or the increase counter step 260, the timed operation mode is timed-out.

Figure 16:
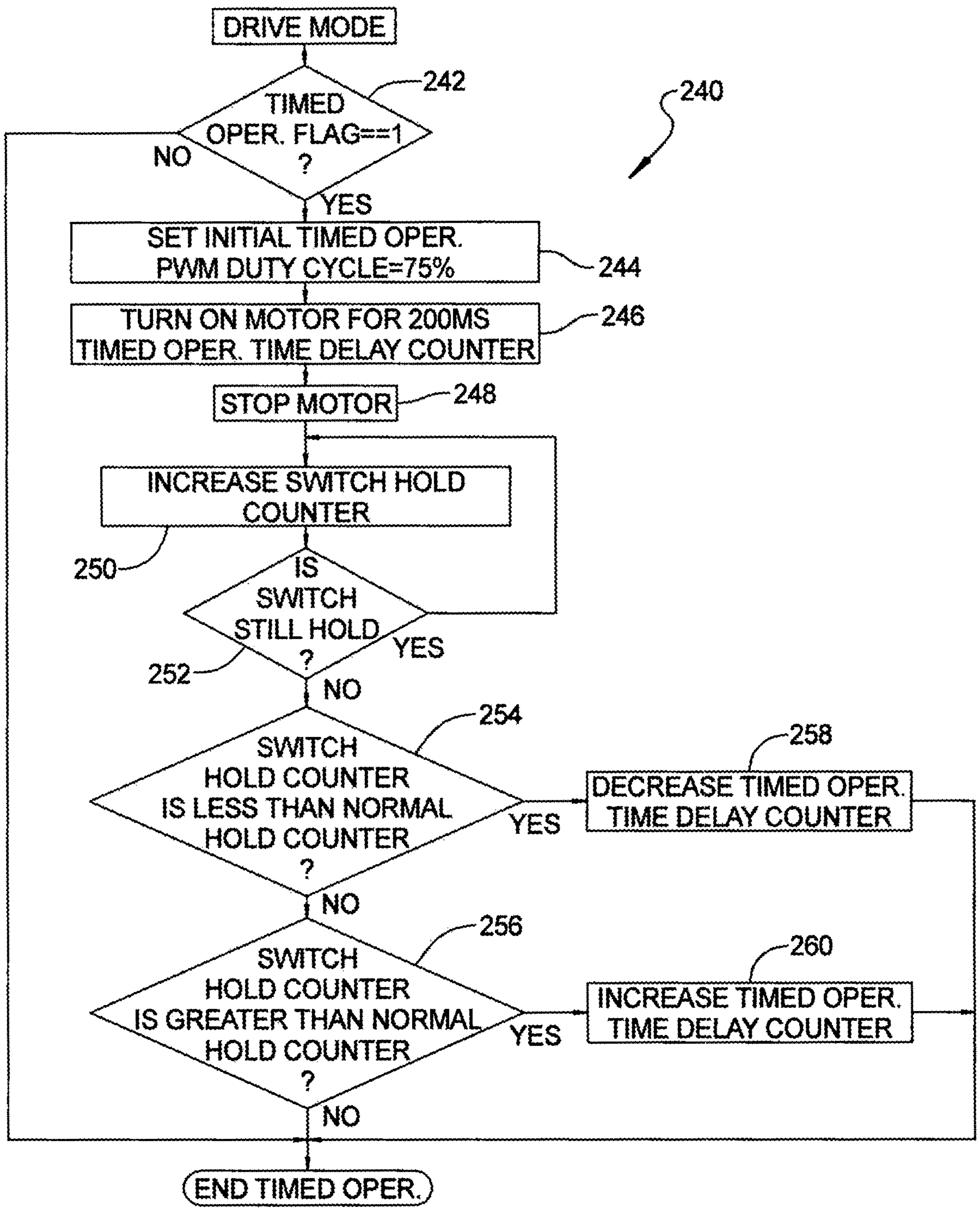
FIG. 16 is a flow diagram of a timed operation mode of the drill driver of FIG. 1.

Referring to FIG. 17 and again to FIG. 16, a voltage versus time graph 262 identifies the current draw at various voltages over time provided for operation of motor 34 in the timed operation mode.

If drill driver 10 is preset to operate in an automatic operating mode, the timed operation mode can be automatically induced when the electronic control system identifies that motor 34 has stopped rotation, for example due to either the maximum current or torque setting being reached, while the user continues to depress trigger 28. After the determination that motor 34 has stopped for a predetermined period of time while trigger 28 is still depressed, the timed operation mode automatically begins and will rotate motor 34 and chuck 20 for approximately 200 ms. The predetermined time period for automatic initiation of the timed operation mode can also be for example one second, or set to any other desired time period.

If drill driver 10 is set to operate in the manual mode and the rotary potentiometer/switch assembly 32 is used to predetermine or preset an operating torque via a torque command for chuck 20, motor 34 will stop when the predetermined torque setting is reached. If the user releases trigger 28 at this time, and then re-depresses trigger 28 within a predetermined period of time, a last saved high current level required to fully seat a fastener, saved for example in the EEPROM or memory device/function of microcontroller 42, will be automatically reapplied, thereby further rotating chuck 20 until the high current level last saved in memory is achieved. This permits a combination of a manual and an automatic operation of drill driver 10 such that the predetermined or preset torque limits manually entered by the user can be supplemented automatically by a current level saved in the memory corresponding to a fully set fastener position.

Figure 18:
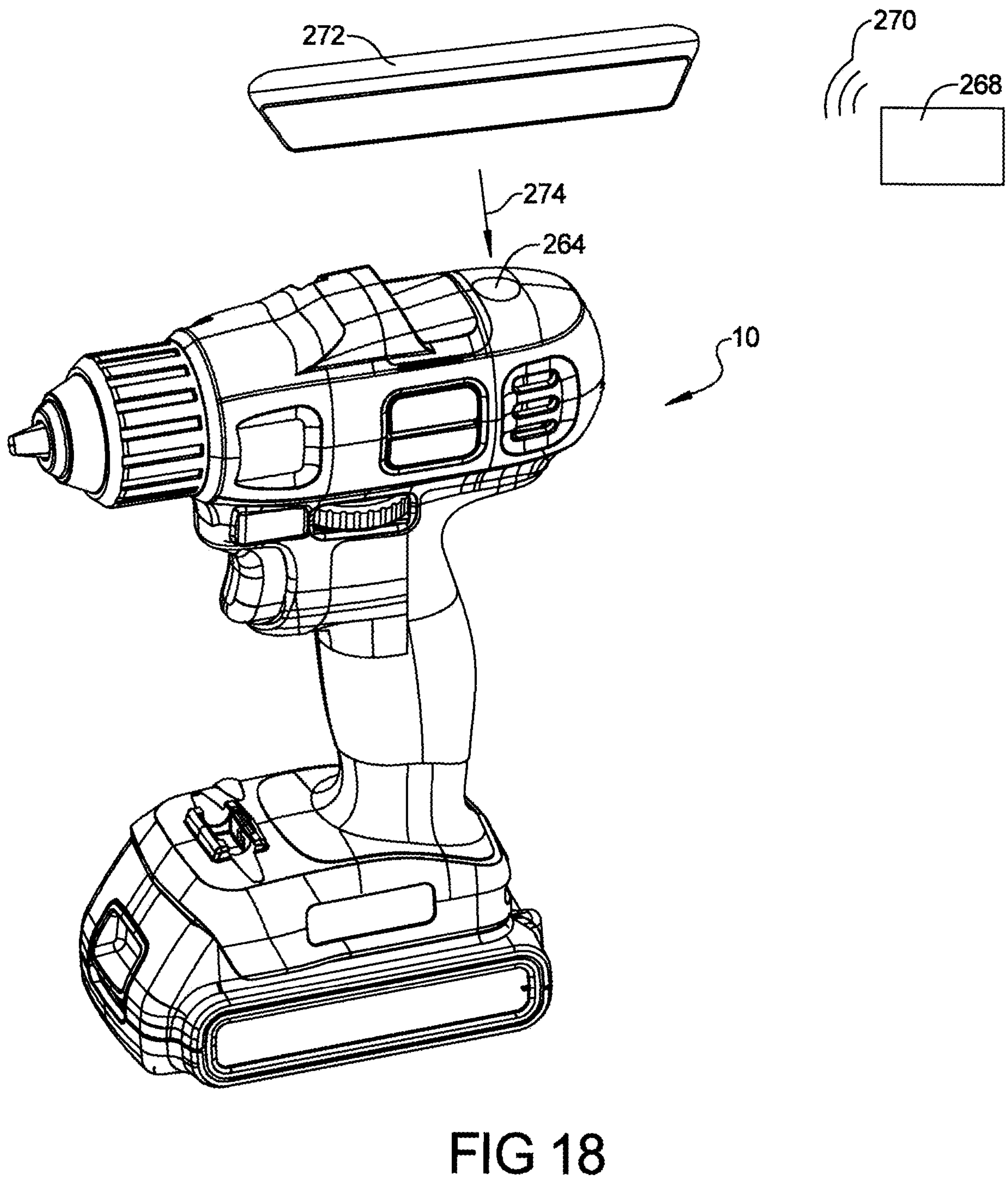
FIG. 18 is a left side perspective view of the drill/driver of FIG. 1 during remote operation with a user interface device.

Referring to FIG. 18 and again to FIGS. 1 and 2, information stored in any of the various memory devices/functions of drill driver 10 can be supplemented by additional information from one or more offsite locations, to increase the number of operations performed by drill driver 10, or to change tool performance for particular tasks. For example, where electronic clutch settings for multiple different fasteners are available for multiple different material combinations, the user can download additional data for these clutch settings which will automatically be saved for use for operation of drill driver 10. To receive new data, a receiver 264 provided in drill driver 10 is connected to a programmable controller 266. According to one aspect, an application library 268 that is remote from drill driver 10 contains data to transfer to drill driver 10. Data stored at application library 268 can be transferred upon query by the user via a wireless signal path 270 to a user interface device 272. Predetermined password or authorization codes can be sent to the user to authorize entry into application library 268. User interface device 272 can be one of multiple devices, including computers or portable cell phones such as a smartphone. The data received wirelessly by the user interface device 272 and temporarily stored therein can be subsequently transferred by the user via a wireless signal path 274 to drill driver 10. The data received via the wireless signal path 274 from user interface device 272 is received at receiver 264 and stored by programmable controller 266 or other memory devices/functions of drill driver 10. This operation increases or supplements the database of data saved by drill driver 10 such that new information that may become available during the lifetime of drill driver 10 can be used.

Figure 19:
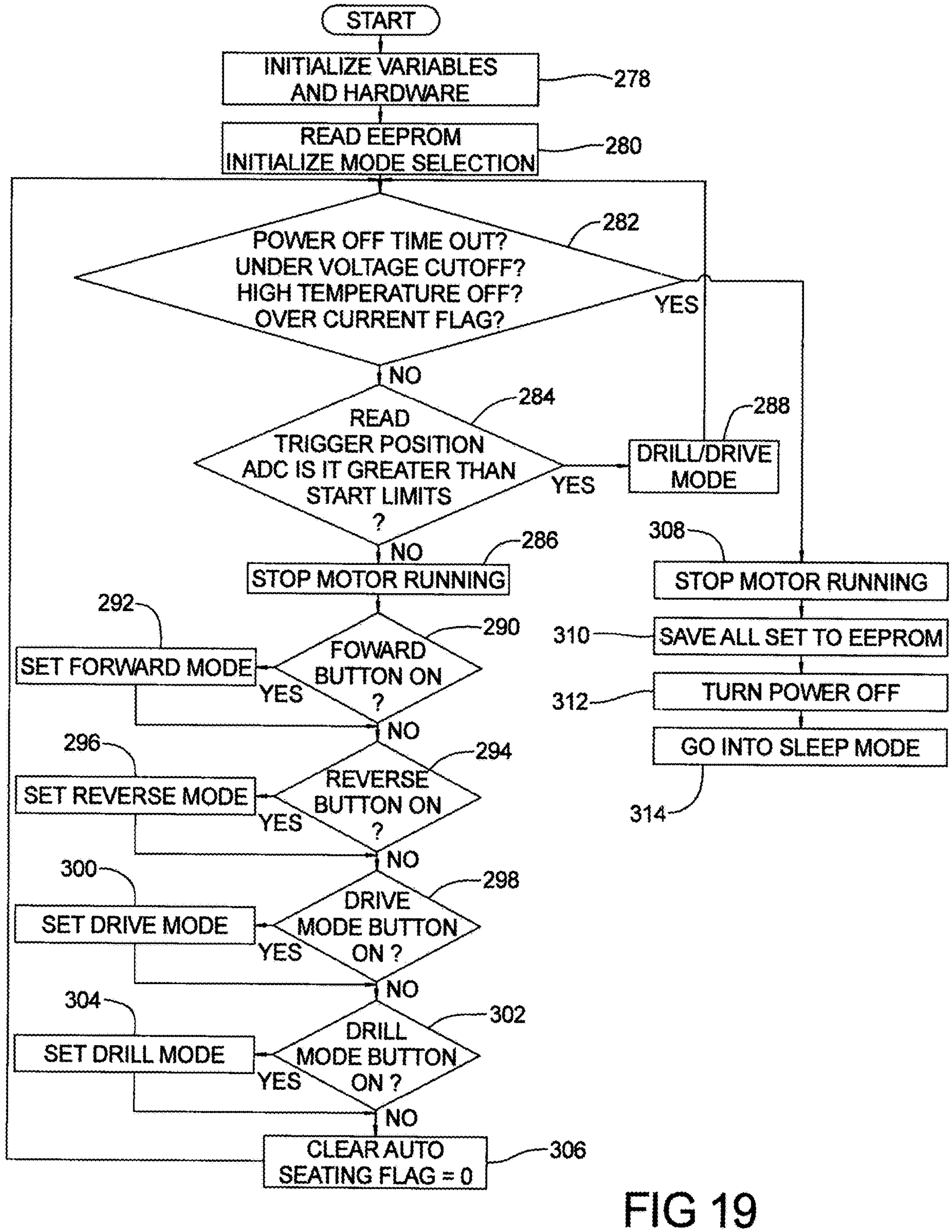
FIG. 19 is a flow diagram of an initialization operation of the drill driver of FIG. 1 for selection of an operating mode.

Referring to FIG. 19, an initialization flow diagram 276 identifies the various steps taken by the electronic control system of drill driver 10 upon initial startup of the unit. In an initialization step 278, variables and hardware required during startup of the unit are initialized. In a following read EEPROM step 280, the data saved in the EEPROM of microcontroller 42 is read to determine the last mode of operation and thereby used to initialize the mode selection for initial operation of drill driver 10. In a check status step 282, it is determined whether any of a power off timeout has occurred, whether an under-voltage cutoff has occurred, whether a high temperature cutoff has occurred, or if an over-current flag is indicated. If none of the conditions identified by check status step 282 are present, a subsequent read trigger step 284 is performed wherein the analog-digital converter (ADC) for trigger 28 is read to determine if the ADC signal is greater than a predetermined start limit. If the start limit is not exceeded, as determined in read trigger step 284, a stop motor running operation 286 is performed. If the limits read for the trigger ADC signal in read trigger step 284 are greater than the predetermined start limits, a select mode step 288 operates to return to the check status step 282.

Following the stop motor running operation 286, a first check button step 290 is performed wherein it is determined if a forward operational selection button or switch is actuated. If the first check button step 290 is positive, a set forward mode step 292 is performed. If the first check button step 290 is negative, a second check button step 294 is performed, wherein it is determined if a reverse operational selection button or switch has been actuated. If the second check button step 294 is positive, a set reverse mode step 296 is performed. If the second check button step 294 is negative, a third check button step 298 is performed wherein a determination is made if the drive mode button or drive mode selector is actuated. If the third check button step 298 is positive, a set drive mode step 300 is performed. If the third check button step 298 is negative, a fourth check button step 302 is performed wherein it is determined if the drill mode button or drill mode selector is actuated. If the result of the fourth check button step 302 is positive, a set drill mode step 304 is performed. If the fourth check button step 302 is negative, a clear flag step 306 is performed wherein an auto seating flag is set to zero.

Returning to the check status step 282, if any of the items checked are indicated, a stop motor step 308 is performed to stop operation of motor 34. Following the stop motor step 308, a saved step 310 is performed wherein last data received, such as a maximum operating torque or operating current, is saved to the EEPROM of microcontroller 42. Following saved step 310, a power off step 312 is performed turning off operating power to drill driver 10 and enter sleep mode step 314 is performed following the power off step 312 to save electrical battery energy of drill driver 10.

Figure 20:
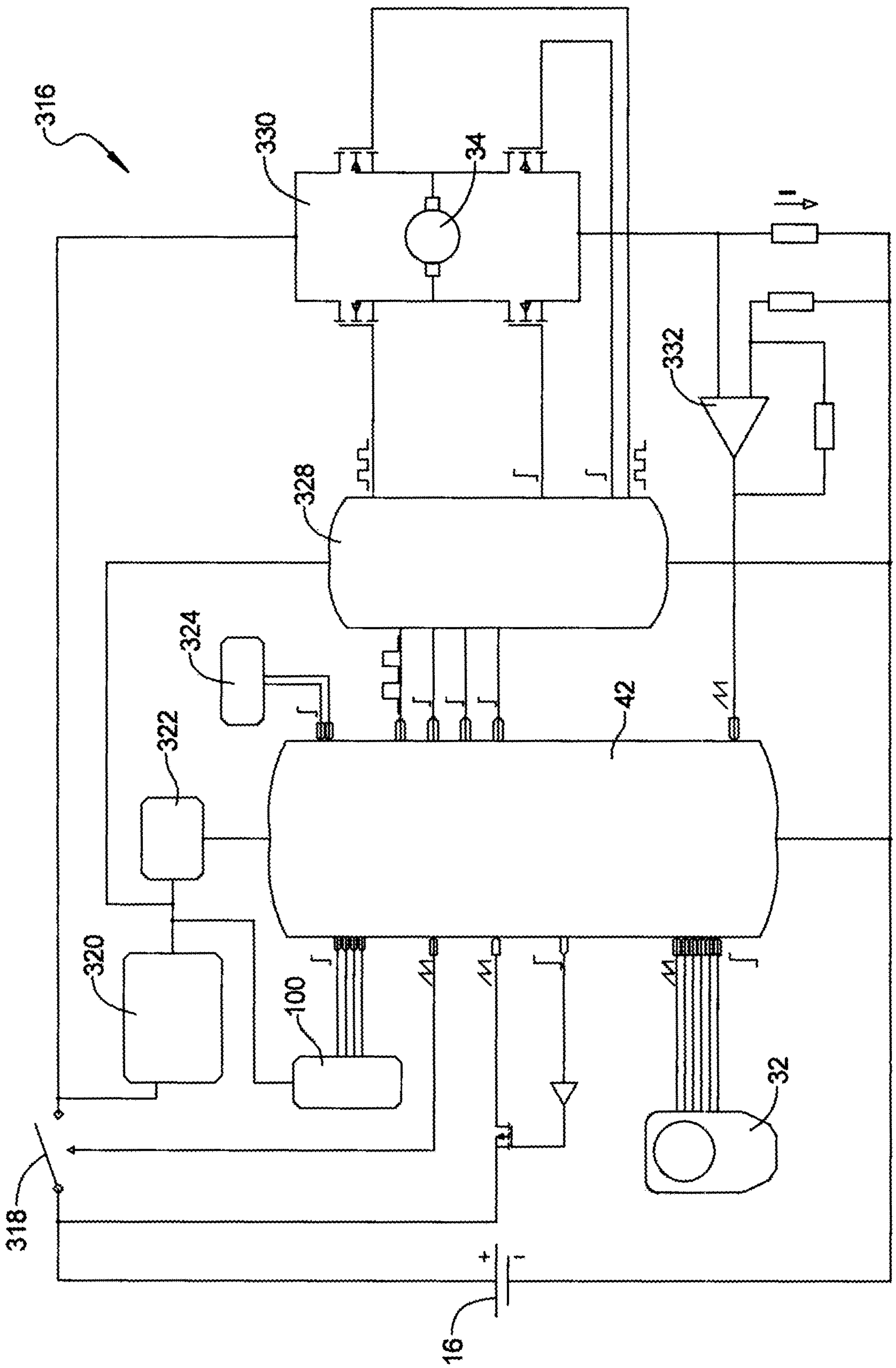
FIG. 20 is a diagram of the electronic control system for the drill driver of FIG. 1.

Referring to FIG. 20 and again to FIGS. 1-2 and 12, a diagram 316 of the electronic control circuit of the present disclosure is provided. The battery 16 voltage is normally isolated when a trigger switch 318 is open. When trigger switch 318 is closed, for example by depressing trigger 28, a DC/DC 10-volt supply 320 is energized by battery 16. The DC/DC 10-volt supply 320 is a 10-volt DC regulator that supplies power to the LED display screen 100 and to an "H" bridge driver which will be further described herein. Also connected to DC/DC 10-volt supply 320 is a 3-volt supply 322. Three-volt supply 322 provides 3-volt power for operation of electronics logic. The LED display screen 100, as previously described herein, provides multiple LEDs including first through sixth LEDs 102-112. A mode select module 324 receives input from operation of either drill selector switch 170 or driver selector switch 172. The LED display screen 100, 3-volt supply 322, mode select module 324, and rotary potentiometer/switch assembly 32 are each connected to a microcontroller 42. Microcontroller 42 controls all peripheral features and interfaces, sets the direction of operation and the pulse-width module setting for "H" bridge control, and further processes all analog input signals for drill driver 10. An "H" bridge driver 328 is also connected to microcontroller 42. "H" bridge driver 328 is a motor controller for a four MOSFET (metal-oxide-silicon field-effect transistor) bridge and controls forward, reverse, and breaking functions of motor 34. An "H" bridge 330 is a group of four MOSFETs connected in an "H" configuration that drive motor 34 in both forward and reverse directions. A current amplifier 332 senses the current draw across a shunt resistor and amplifies the current signal for the microcontroller 42.

Figure 21:
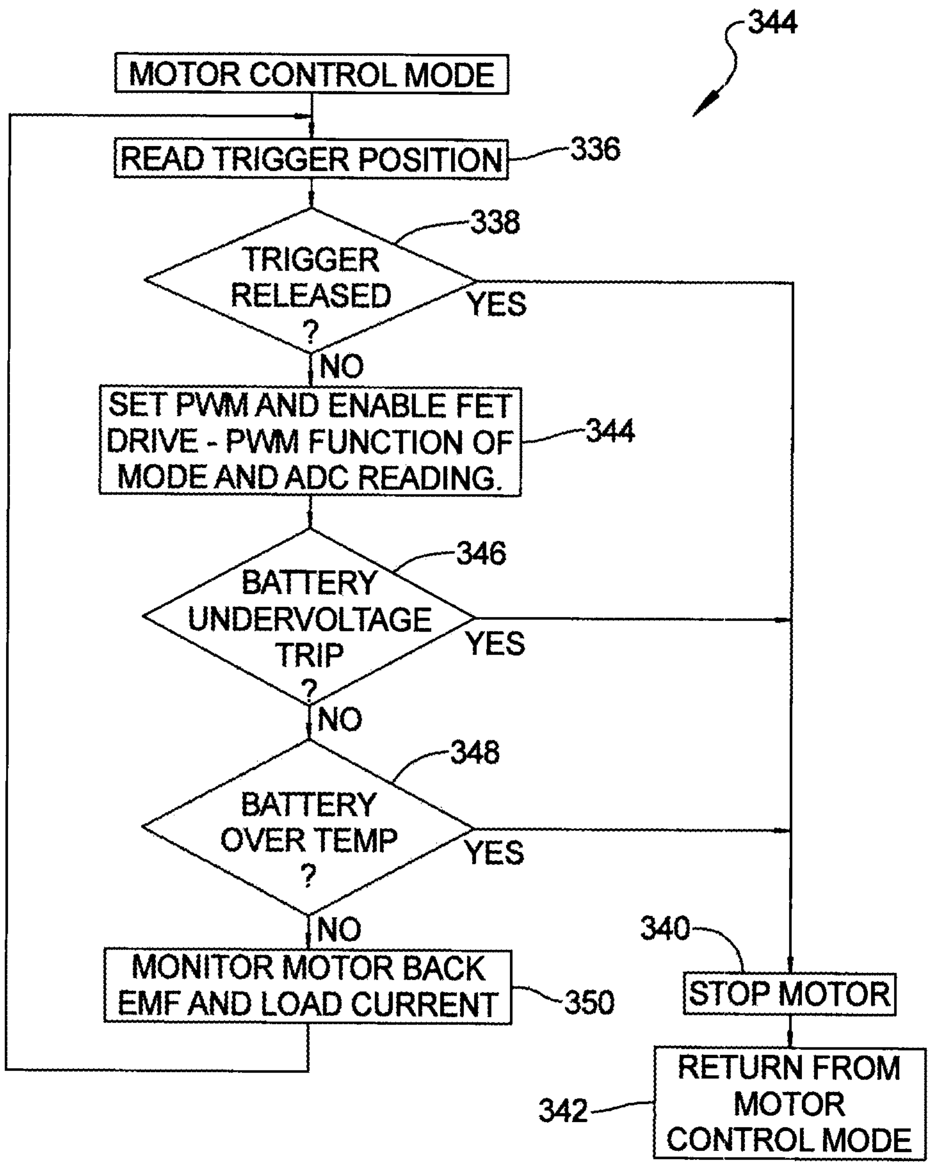
FIG. 21 is a flow diagram of drill driver operation in a motor control mode.

Referring to FIG. 21, a motor control mode flow diagram 334 identifies the various operational steps performed during motor control mode operation. A read trigger position step 336 is initially performed to identify an "on" or "off" position of trigger 28. Following the read trigger position step 336, a trigger release check 338 is performed to identify when trigger 28 is released following depression. If trigger 28 has been released, a stop motor step 340 is performed, stopping operation of motor 34. A subsequent return step 342 is performed to return to the motor control mode. If the trigger 28 has not been released, as determined by trigger release step 338, a setting step 344 is performed wherein the pulse-width modulation is set and an FET (field effect transistor) drive is enabled. Following the setting step 344, a check step 346 is performed to determine if a battery under-voltage trip has occurred. If a battery under-voltage trip has occurred, the stop motor step 340 is performed. If no battery under-voltage trip has occurred during check step 346, a subsequent battery over-temperature check 348 is performed to determine if an over-temperature condition of battery pack 16 has occurred. If a battery over-temperature condition has occurred, the stop motor step 340 is performed. If there is no indication of a battery over-temperature condition, a monitoring step 350 is performed wherein the motor back EMF (electromagnetic field) and load current are monitored during the time period of operation in motor control mode.

Figure 22A:
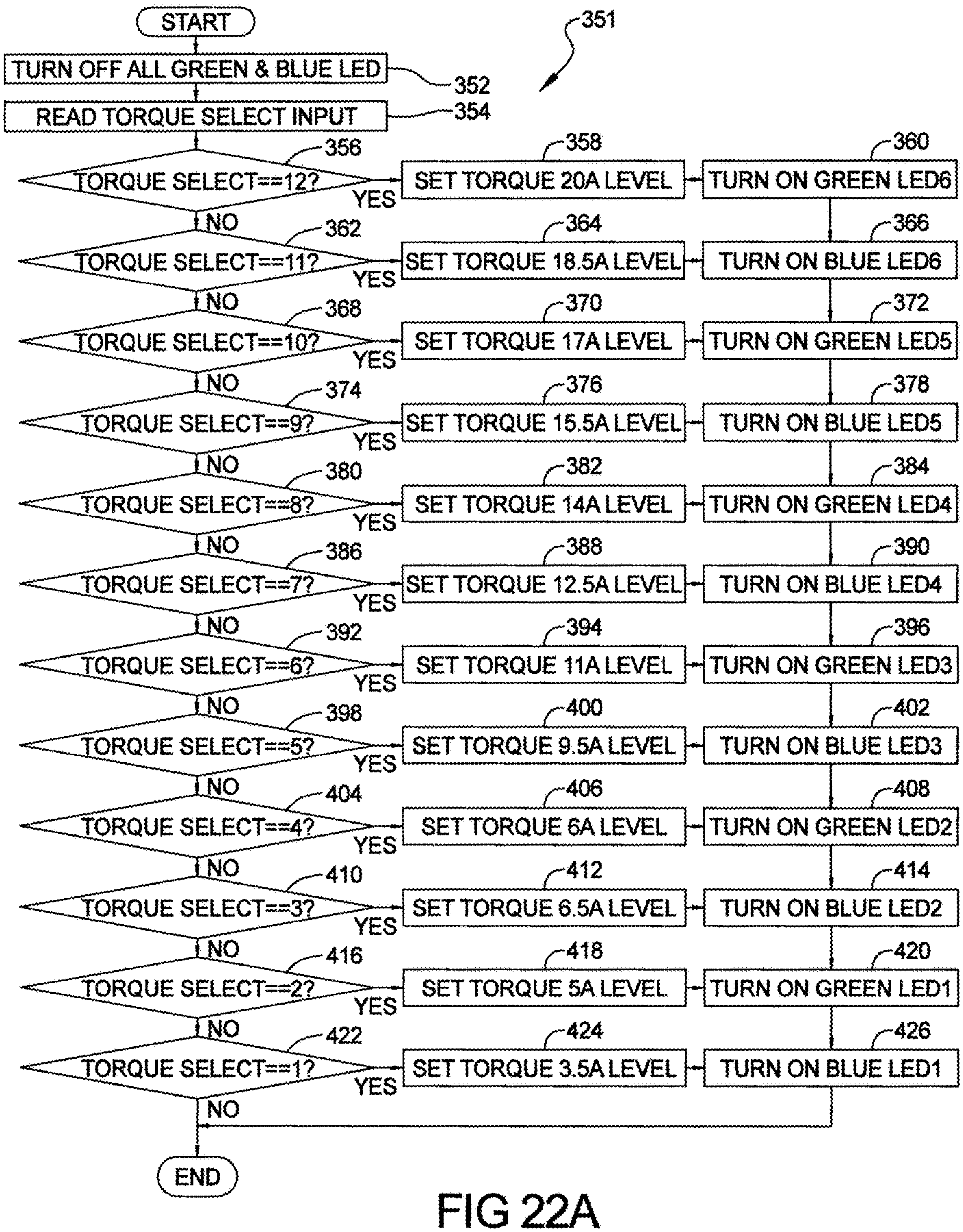
FIG. 22A is a flow diagram of LED illumination corresponding to selected clutch torque settings.

Referring to FIG. 22A and again to FIGS. 1-6 and 8, as the user rotates rotary member 36 to adjust or set a clutch torque setting, individual ones of the first through sixth LEDs 102-112 may be illuminated. This provides visual indication to the user of the relative increase or decrease in torque setting. Initially, upon rotation in any direction of rotary member 36, in a step 352 all of the green or blue LEDs that are currently illuminated are turned off. Following this, a read torque select input step 354 is performed wherein the electrical signal generated by rotation of rotary member 36 is read which corresponds to a selected torque input.

According to several aspects, axial rotation of rotary member 36 provides twelve individual torque settings. In a first torque select step 356, a determination is made if the selected torque input corresponds to torque setting 12. If step 356 is affirmative, in a setting torque step 358, a torque level of 20 amps is set. At this time, in a step 360, green LED represented by sixth LED 112 is illuminated. If the result of step 356 is negative, in a following step 362, a determination is made if the selected torque input corresponds to torque setting 11. If affirmative, in a step 364, a torque of 18.5 amp level is set. At this same time, the color of sixth LED 112 is changed from green to blue in a step 366. If the response from step 362 is negative in a step 368, a determination is made if the selected torque input corresponds to torque setting 10. If the answer is affirmative, in a step 370, a torque level of 17 amps is set. At this time, the fifth LED 110 is illuminated using a green color in a step 372. If the response to step 368 is negative, in a step 374, a determination is made if the selected torque input corresponds to torque setting 9. If the response is affirmative, in a step 376, a torque of 15.5 amp level is set. At this time, fifth LED 110 is changed from green to blue in a step 378. If the response from step 374 is negative, in a step 380, a determination is made if the selected torque input corresponds to torque setting 8. If affirmative, in a step 382, a torque level of 14 amps is set. At this time, the fourth LED 108 is illuminated using a green color in a step 384. If the response from step 380 is negative, in a step 386, a determination is made if the selected torque input corresponds to torque setting 7. If affirmative, in a step 388, a torque of 12.5 amp level is set. At this time, the fourth LED 108 is changed from green to a blue color in a step 390. If the response to step 386 is negative, in a step 392, a determination is made if the selected torque input corresponds to torque setting 6. If affirmative, in a step 394, a torque of 11 amp level is set. At this time, the third LED 106 is illuminated using a green color in a step 396. If the response from step 392 is negative, in a step 398, a determination is made if the selected torque input corresponds to torque setting 5. If affirmative, in a step 400, a torque of 9.5 amp level is set. At this time, the third LED 106 is changed from a green to a blue color in a step 402. If the response to step 398 is negative, in a step 404, a determination is made if the selected torque input corresponds to torque setting 4. If affirmative, in a step 406, a torque of 8 amp level is set. At this time, the second LED 104 is illuminated using a green color in a step 408. If the response to step 404 is negative, in a step 410, a determination is made if the selected torque input corresponds to torque setting 3. If affirmative, in a step 412, a torque of 6.5 amp level is set. At this time, the second LED 104 is changed from a green to a blue color in a step 414. If the response to step 410 is negative, in a step 416, a determination is made if the selected torque input corresponds to torque setting 2. If affirmative, in a step 418, a torque of 5 amp level is set. At this time, the first LED 102 is illuminated using a green color in a step 420. If the response to step 416 is negative, in a step 422, a determination is made if the selected torque input corresponds to torque setting 1. If affirmative, in a step 424, a torque of 3.5 amp level is set. At this time, the first LED 102 is changed in color from green to blue in a step 426. It is noted that the sequencing identified in clutch torque flow diagram 351 corresponds to a decreasing torque value manually set by the user. The sequence is reversed if the user is selecting torque values that increase in value.

Referring to FIG. 22B, a lookup table 428 provides saved values corresponding to the selected torque input level. A torque level in amps corresponding to the torque input level is also provided, as well as the corresponding color and illuminated LED for the LED display.

Figure 23:
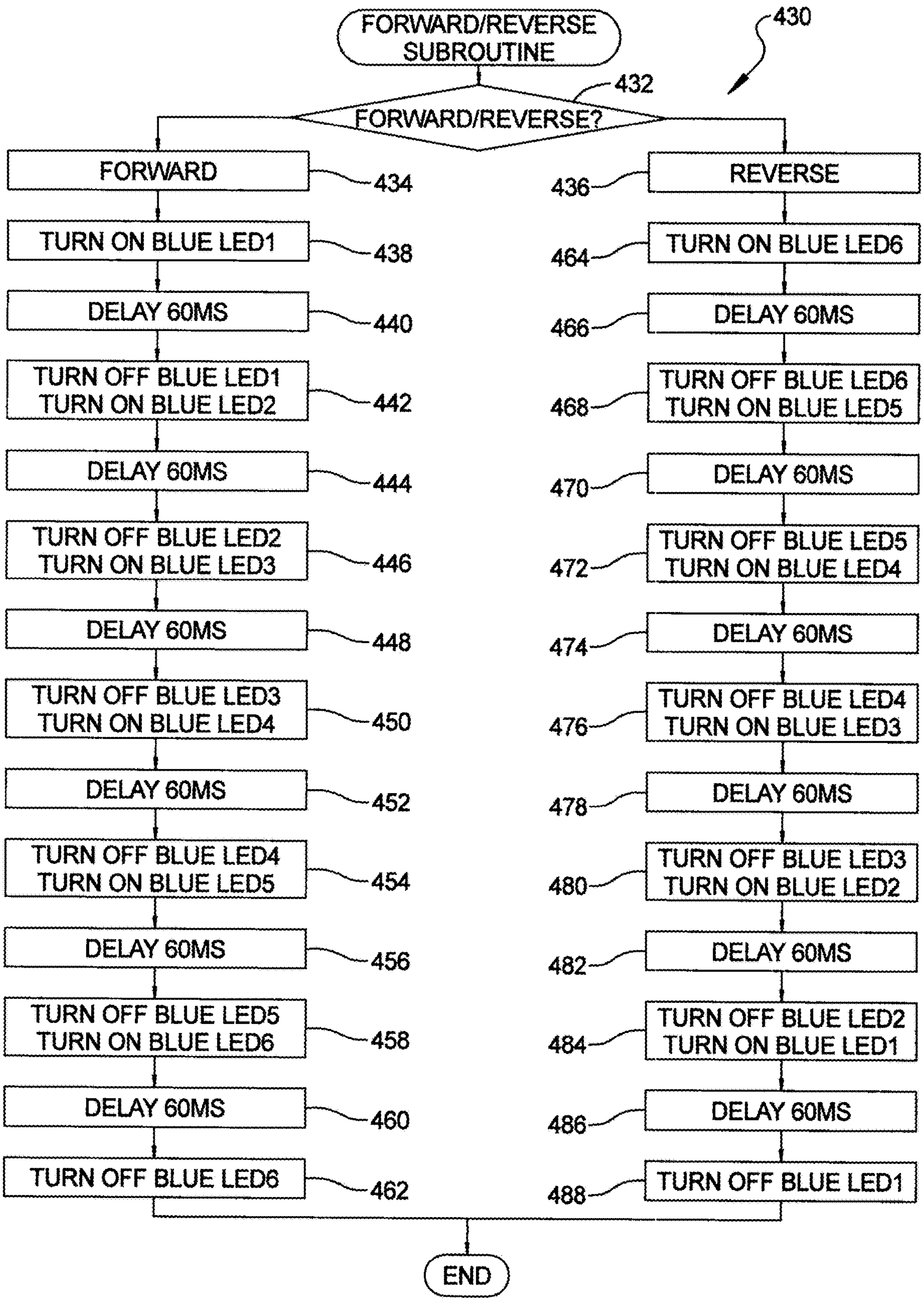
FIG. 23 is a flow diagram for LED illumination indicated during each of a forward and a reverse clutch operation.

Referring to FIG. 23 and again to FIGS. 1-6 and 8, when the user manually displaces the rotary potentiometer/switch assembly 32 by pushing in either a right-to-left or left-to-right direction against rotary member 36, a drill driver 10 clutch rotation direction is selected or changed. As previously noted, opposite displacements of rotary potentiometer/switch assembly 32 provide either a forward or a reverse clutch rotational direction. A forward/reverse LED display flow diagram 430 identifies the corresponding LED display that is presented upon selecting either the forward direction in a forward step 434 or the reverse direction in a reverse step 436. These steps follow an initial inquiry in a forward/reverse step 432 initiated by motion of the rotary member 36. If the forward rotational direction is selected, following forward step 434 and in sequential order, each of the first through sixth LEDs 102-112 are illuminated. Initially, in a step 438, the first LED 102 is illuminated using a blue color. Following a 60 millisecond delay step 440, first LED 102 is turned off and second LED 104 is turned on in a blue color in a step 442. Following a 60 millisecond delay step 444, second LED 104 is turned off and third LED 106 is turned on in a blue color in a step 446. Following another delay of 60 ms in a step 448, third LED 106 is turned off and fourth LED 108 is turned on in a blue color in a step 450. Following a delay of 60 ms in a step 452, fourth LED 108 is turned off and fifth LED 110 is turned on in a blue color in a step 454. Following an additional 60 ms delay step 456, the fifth LED 110 is turned off and the sixth LED 112 is turned on in a blue color in a step 458. Following a final delay of 60 ms in a step 460, the sixth LED 112 is turned off in a step 462. Based on the sequence of operation of first through sixth LEDs 102-112 in the forward operating mode, the LEDs will appear to rapidly illuminate in a clockwise direction.

An opposite operation starting with illumination of sixth LED 112 and continuing to first LED 102 occurs if the reverse step 436 is actuated. Following reverse step 436, sixth LED 112 is illuminated in a blue color in a step 464. Following a delay of 60 ms in a step 466, the sixth LED 112 is turned off and the fifth LED 110 is turned on in a blue color in a step 468. Following a delay of 60 ms in a step 470, the fifth LED 110 is turned off and the fourth LED 108 is turned on in a blue color in a step 472. Following a delay of 60 ms in a step 474, the fourth LED 108 is turned off and the third LED 106 is turned on in a blue color in a step 476. Following an additional delay of 60 ms in a step 478, the third LED 106 is turned off and the second LED 104 is turned on in a blue color in a step 480. Following a delay of 60 ms in a step 482, the second LED 104 is turned off and the first LED 102 is turned on in a blue color in a step 484. Finally, following a delay of 60 ms in a step 486, the first LED 102 is turned off in a step 488. Based on the sequence of operation of sixth through first LEDs 112-102 in the reverse operating mode, the LEDs will appear to rapidly illuminate in a counter-clockwise direction.

Figure 28:
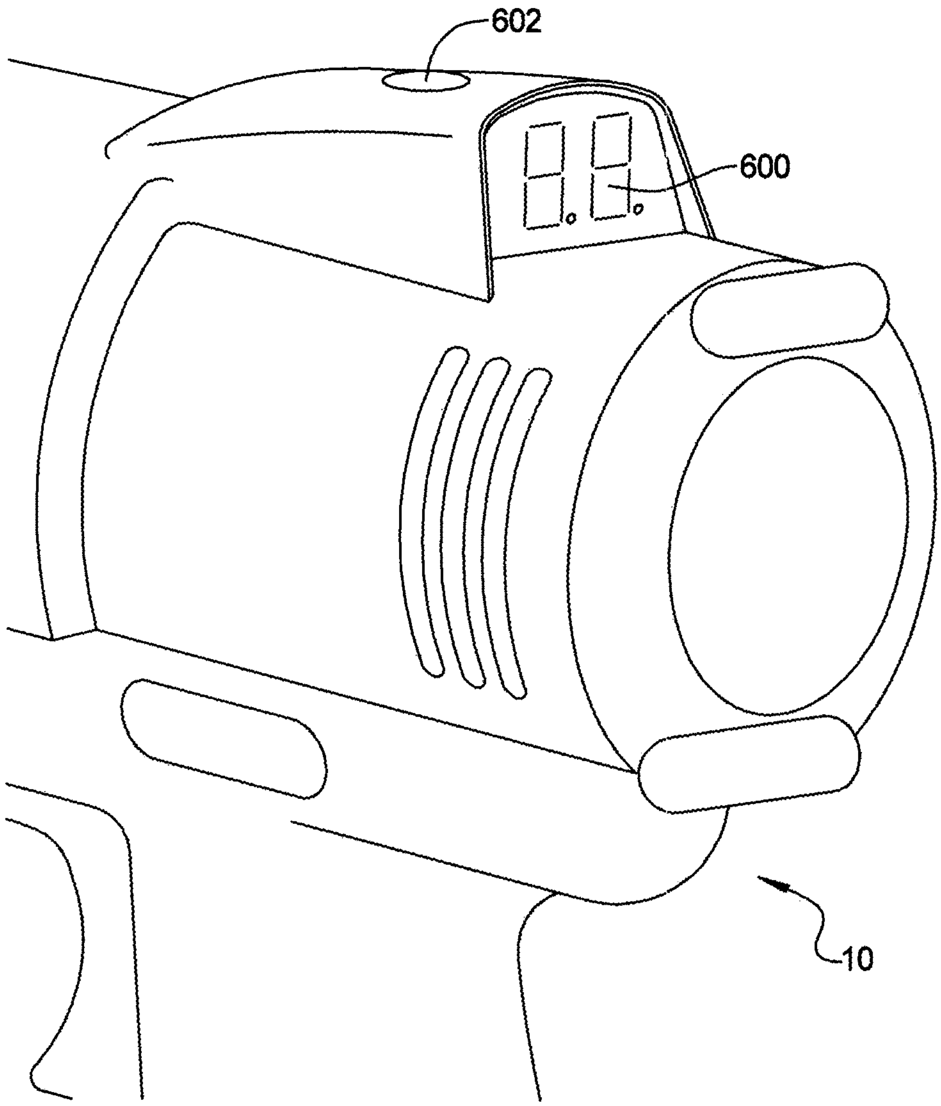
FIG. 28 is a perspective view of a drill driver having an alternative display.

One of the drawback of the LED-based display described above is that the clutch setting is not quantified for the tool operator. An alternative display 600 for a drill driver 10 having an electronic clutch is shown in FIG. 28. In this alternative embodiment, a number corresponding to the clutch setting is displayed on the display 600. For example, the numeric value may range from one to six as described above in relation to FIG. 10. In one embodiment, the display 600 may be implemented using a simple dot matrix display although other types of displays are also contemplated by this disclosure. The clutch setting can be set, for example, using the rotary member 36. Other types on mechanisms fall for selecting a clutch setting also within the broader aspects of this feature. In some embodiments, a light sensor 602 may also be integrated into the housing of the drill driver 10. The signal from the light sensor is received by the controller and can be used to adjust the brightness of the display, thereby improving the visibility of the display in different light conditions.

For drill drivers having multi-speed transmissions, the maximum clutch torque setting for the mechanical clutch is dictated by the maximum torque that can be achieved in a high speed (low torque) setting. Setting the maximum torque setting for the clutch in this manner prevents the tool from stalling regardless of the speed and clutch settings but creates a difference in the maximum torque setting between low speed and high speed modes. In an electronic clutch, different ranges of clutch settings can be assigned to each of the different speed settings. For example, in a high speed (low torque) setting, the clutch settings may range between eight settings (i.e., 1-8); whereas, in the low speed (high torque) setting, the clutch setting may range between twelve settings (i.e., 1-12), where for clutch setting correlates to a different user selectable predefined maximum torque level as noted above. To support this arrangement, the clutch settings are display by the controller on the display 600 using different scales. When the tool is in the low speed setting, all twelve clutch settings can be selected by the user and thus may be displayed on the display. When the tool is in the high speed setting, only the first eight settings (i.e., 1-8) are selected by the user and thus may be display on the display. In some embodiments, the clutch setting mechanism (e.g., rotary member 36) enables the user to pick from the full range of settings (e.g., 12 different settings). In the case the tool is in the high speed setting, values for the first eight setting are displayed as well as the value for the eight setting being displayed for the four additional setting available on the clutch setting mechanism. That is, values for the twelve selectable setting of the rotary member are displayed as 1, 2, 3, 4, 5, 6, 7, 8, 8, 8, 8, 8, respectively. While reference is made to a drill driver with two speed transmission, it is readily understood that this concept may be extended to three or more speed transmissions as well.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A power tool, comprising:

a body having a handle configured to be grasped by a user;

a motor in the body;

a battery mounting portion configured to receive a battery pack;

a controller;

a driver connected to the controller, the driver configured to control at least one function of the motor;

a first power supply of a first voltage;

a second power supply of a second voltage;

a wireless communicator;

wherein the first voltage is more than double the second voltage;

wherein the first power supply is configured to provide power to the driver.

2. The power tool of claim 1, further comprising a circuit board in the handle.

3. The power tool of claim 2, wherein the controller is on the circuit board.

4. The power tool of claim 3, wherein the wireless communicator is remote from the circuit board.

5. The power tool of claim 3, wherein the wireless communicator comprises a wireless receiver.

6. The power tool of claim 1, wherein the wireless communicator is configured to communicate with a user interface device separate from the power tool.

7. The power tool of claim 1, further comprising a first button, a second button and a third button on an upward facing surface of the body.

8. The power tool of claim 1, further comprising at least one button for selecting an operating mode of the power tool.

9. The power tool of claim 8, wherein the at least one button is on an upward facing surface of the body.

10. The power tool of claim 9, further comprising a light to indicate a selected operating mode of the power tool.

11. The power tool of claim 1, wherein performance of the power tool is configured to be changed based upon data received through the wireless communicator.

12. A power tool, comprising:

a body having a handle configured to be grasped by a user;

a motor in the body;

a battery mounting portion configured to receive a battery pack;

a first circuit board;

a second circuit board;

a driver, the driver configured to control at least one function of the motor;

a first power supply of a first voltage;

a second power supply of a second voltage;

a wireless communicator;

wherein the first voltage is more than double the second voltage;

wherein the first power supply is configured to provide power to the driver.

13. The power tool of claim 12, wherein the first circuit board and the second circuit board are in electrical communication.

14. The power tool of claim 13, wherein performance of the power tool is configured to be changed based upon data received through the wireless communicator.

15. The power tool of claim 13, further comprising a connector on the second circuit board configured to facilitate electrical communication between the first circuit board and the second circuit board.

16. The power tool of claim 12, wherein the first circuit board is in the handle.

17. The power tool of claim 16, wherein performance of the power tool is configured to be changed based upon data received through the wireless communicator.

18. The power tool of claim 12, wherein the wireless communicator comprises a wireless receiver configured to receive data from a user interface device separate from the power tool.

19. A power tool, comprising:

a body having a handle configured to be grasped by a user;

a motor in the body;

a manually depressible actuator configured to actuate the power tool a battery mounting portion configured to receive a battery pack;

a first circuit board;

a controller on the first circuit board;

a driver connected to the controller, the driver configured to control at least one function of the motor;

a first power supply of a first voltage;

a second power supply of a second voltage;

a wireless communicator;

wherein the first voltage is more than double the second voltage;

wherein the first power supply is configured to provide power to the driver.

20. The power tool of claim 19, further comprising at least one button for selecting an operating mode of the power tool; and wherein the at least one button is on an upward facing surface of the body.

* * * * *